Figure 4:
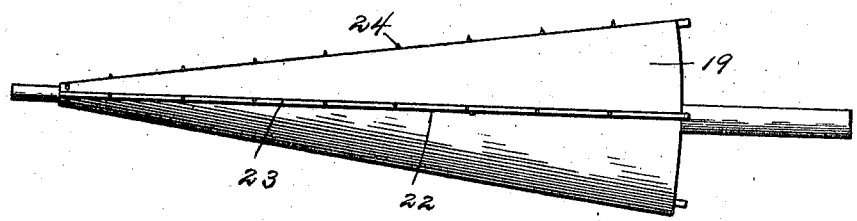

W. L. SPOON.
PRESS FOR BALING FIBROUS MATERIAL.
APPLICATION FILED OCT. 24, 1896.
963,823.
Patented July 12, 1910.
10 SHEETS—SHEET 1.
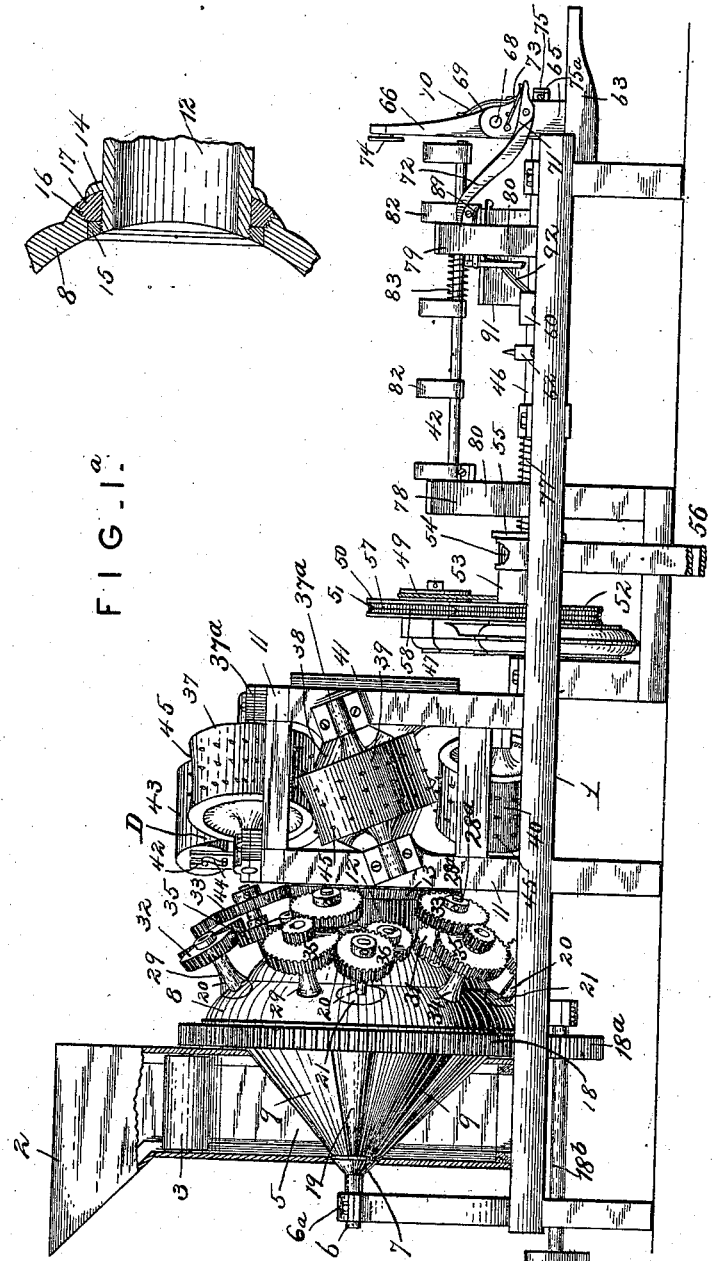
Witnesses
Harry L. Ames.
J. C. Tappan
Inventor,
William L. Spoon,
By John Wedderburn
Attorney W. L. SPOON.
PRESS FOR BALING FIBROUS MATERIAL.
APPLICATION FILED OCT. 24, 1896.
963,823.
Patented July 12, 1910.
10 SHEETS—SHEET 2.
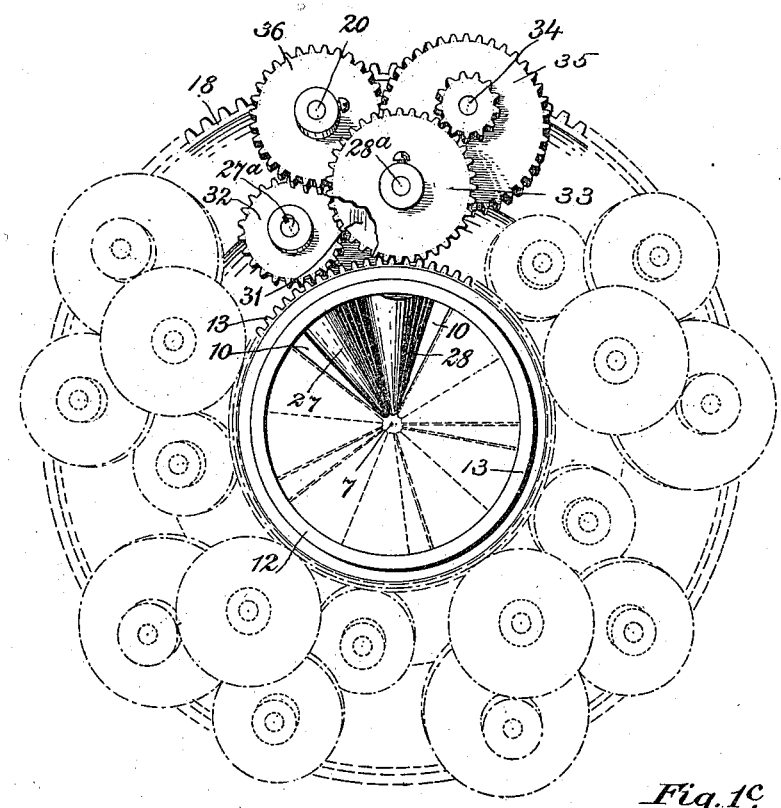
FIG. 2.
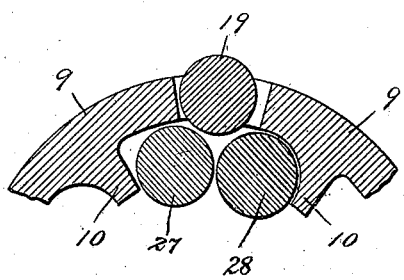
FIG. 3.
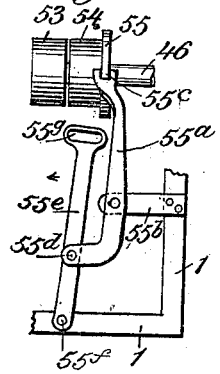
Fig. 1ᶜ
WITNESSES
Harry L. Ames
J. C. Tappan
INVENTOR,
William L. Spoon
by John Wedderburn
Attorney W. L. SPOON.
PRESS FOR BALING FIBROUS MATERIAL.
APPLICATION FILED OCT. 24, 1896.
963,823.
Patented July 12, 1910.
10 SHEETS—SHEET 3.
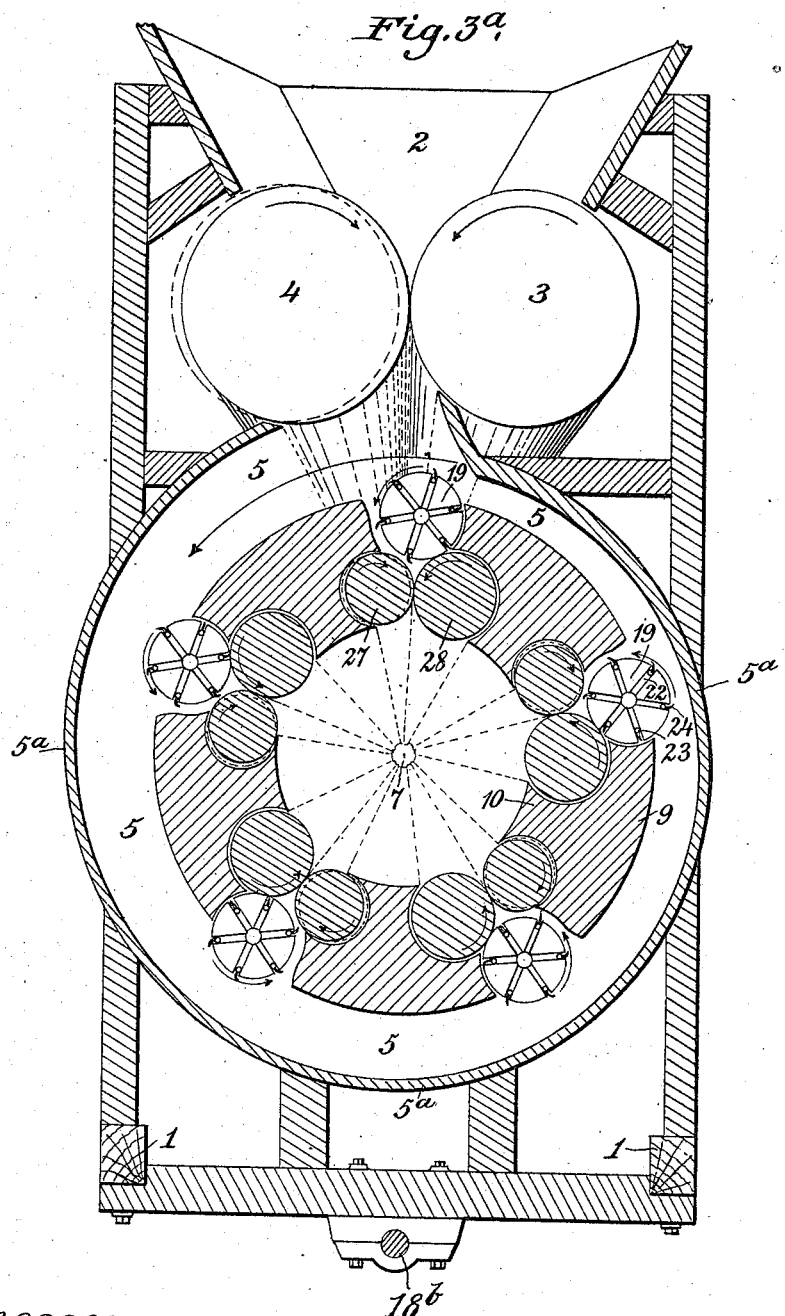
Fig. 3ª
Witnesses:
Carrie R. Ivy
W. Whaley
Inventor:
William L. Spoon
By Cyrus Kehr
Attorney

W. L. SPOON.
PRESS FOR BALING FIBROUS MATERIAL.
APPLICATION FILED OCT. 24, 1896.

963,823.

Patented July 12, 1910.
10 SHEETS—SHEET 4.

WITNESSES
Harry L. Amer.
J. C. Tappan

INVENTOR
William L. Spoon
by John Wedderburn
Attorney

THE NORRIS PETERS CO., WASHINGTON, D. C.

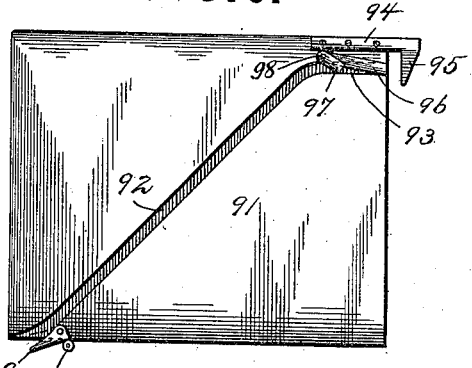
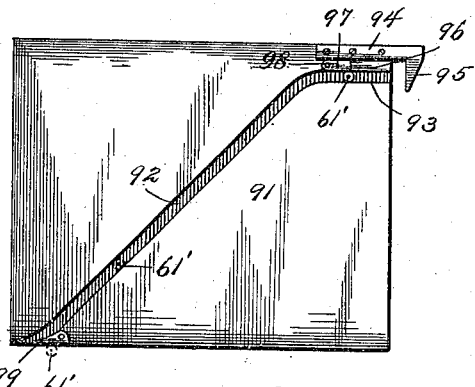
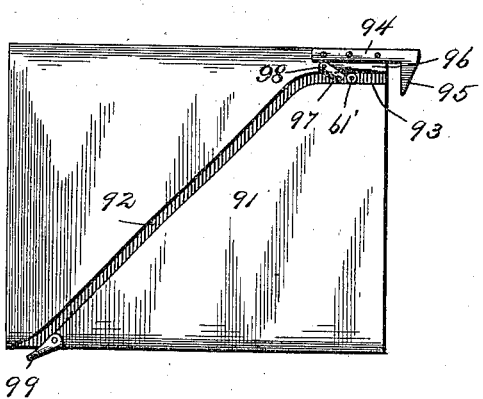

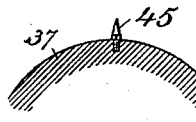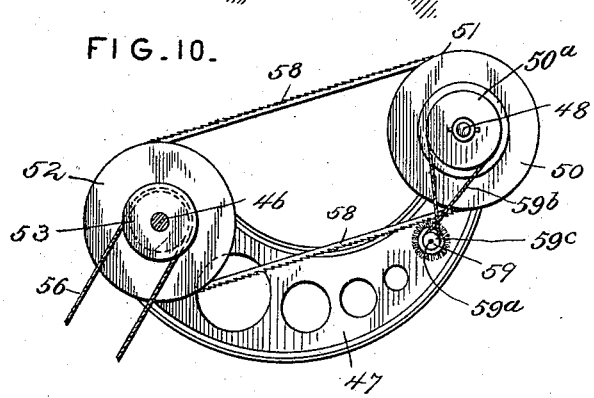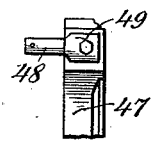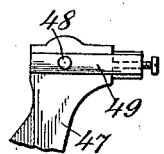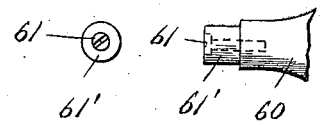

W. L. SPOON.
PRESS FOR BALING FIBROUS MATERIAL.
APPLICATION FILED OCT. 24, 1896.

963,823.

Patented July 12, 1910.
10 SHEETS—SHEET 7.

WITNESSES

INVENTOR
William L. Spoon,
by John Wedderburn
Attorney

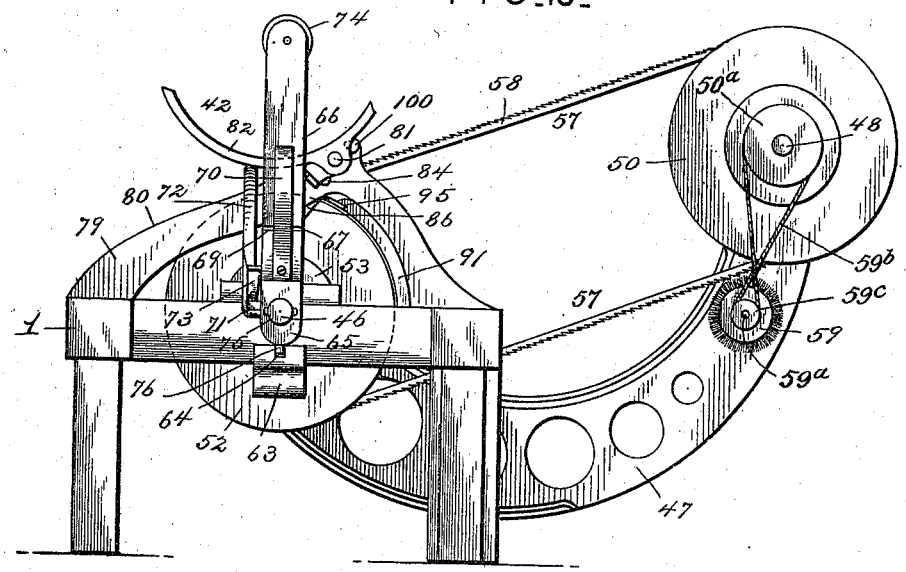
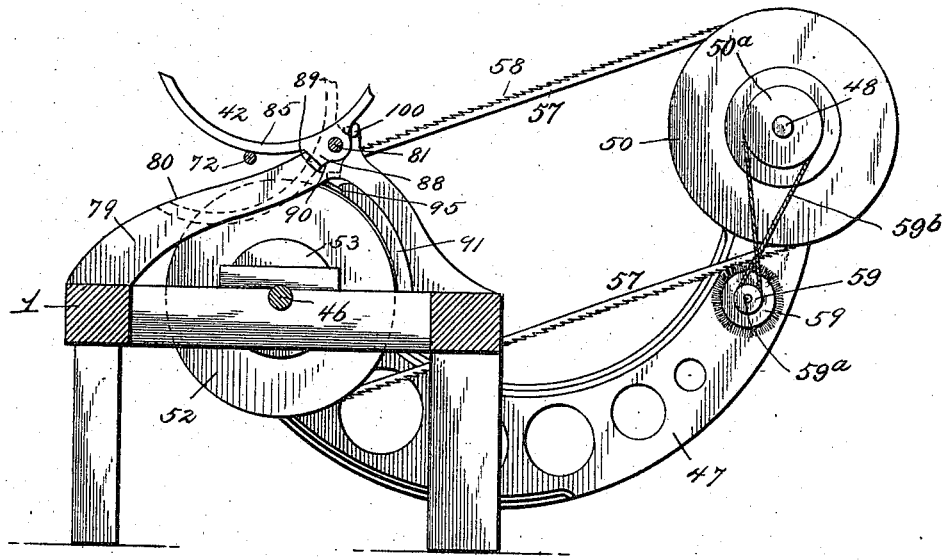

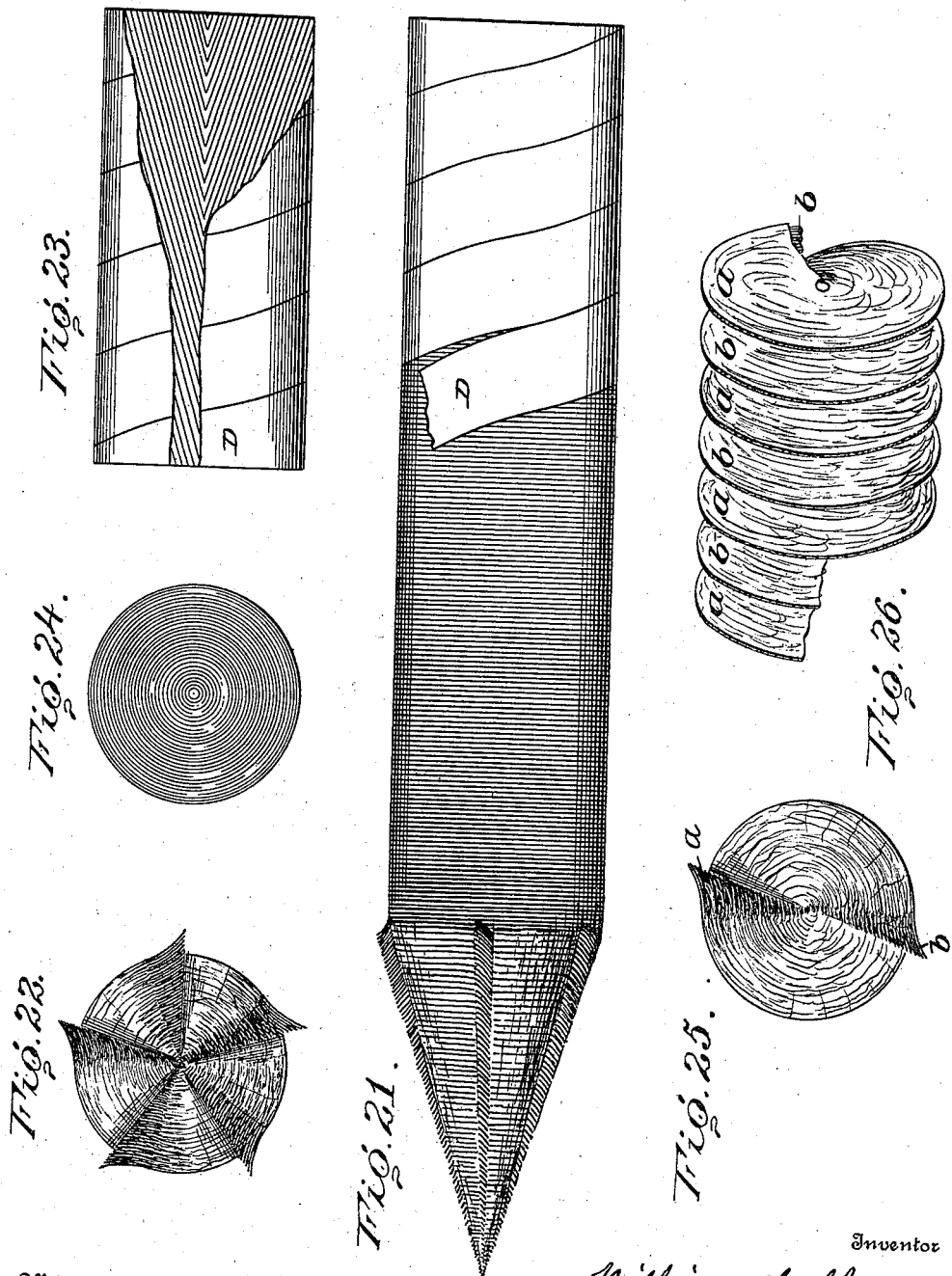

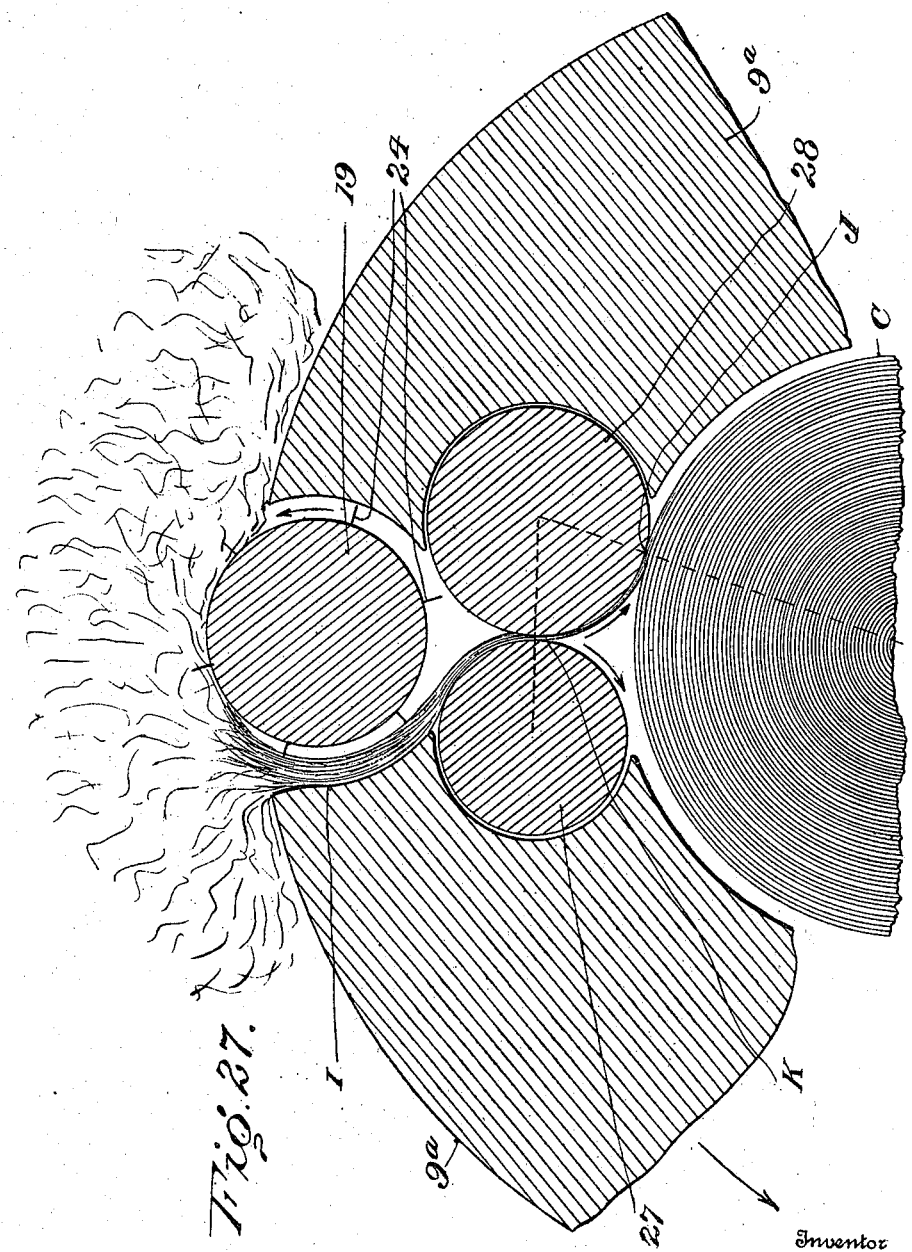

UNITED STATES PATENT OFFICE.

WILLIAM L. SPOON, OF COBLE TOWNSHIP, ALAMANCE COUNTY, NORTH CAROLINA.

PRESS FOR BALING FIBROUS MATERIAL.

963,823. Specification of Letters Patent. Patented July 12, 1910.

Application filed October 24, 1896. Serial No. 609,902.

*To all whom it may concern:*

Be it known that I, WILLIAM L. SPOON, a citizen of the United States, residing at Coble township, in the county of Alamance and State of North Carolina, have invented a new and useful Improvement in Presses for Baling Fibrous Material, of which the following is a specification, reference being had to the accompanying drawing.

My invention relates particularly to the baling of cotton and similar fibrous materials which have relatively high commercial values and require to be well preserved from the time and place of harvesting to the time and place of use in mill or factory. The most important of these fibrous materials is cotton.

The operation of my improved press results in the forming of "round" or cylindrical bales having characteristics to be hereinafter described.

In the operation of my improved press, the cotton is taken continuously, in small quantities (a thin sheet-form stream), from a loose or unorganized mass of cotton and formed, organized, or fabricated into a bat or sheet of substantial continuity and uniformity of thickness, and in organizing the sheet and applying it, the fibers are more or less "paralleled" and "drawn" or intertwined. And such sheet is made quite thin. And the operation of forming or organizing said sheet or bat varies gradually in rapidity from one edge of the sheet to the other, such variation being from substantially zero at one margin or edge to the maximum rapidity at the opposite edge. On account of such variation in rapidity, the sheet assumes a spiral form, with one edge directed toward the axis of the spiral. Such operation, as a whole, results in forming, organizing, or fabricating a thin, spiral sheet, of substantial continuity and even thickness from edge to edge and from end to end and having its fibers paralleled and drawn or intertwined. For convenience, said sheet is hereinafter termed a "spiral sheet", and the stream of fibers from which said sheet is formed is termed a "sheet-spiral" stream.

If the rapidity of formation at one edge of the sheet approximates zero, said edge will extend approximately to the axis of the spiral. Said edge may, therefore, be termed the inner or "axial" edge, and the opposite edge may be termed the outer or "peripheral" edge. And while the sheet is being so formed and organized, it is preferably subjected to an initial or preliminary pressure, whereby it is made dense and the air is expelled; and, subsequent to such initial compression, said sheet is, preferably, kept under tension, for maintenance of such compression and exclusion of air and for the further "drawing" of the fiber and for the placing of the sheet or bat upon the forming bale or bale-trunk under tension. For the forming of the bale (or bale-trunk which may be severed into sections constituting bales), the convolutions of said spiral sheet are, as fast as the sheet is formed, laid closely or densely against each other by suitable pressure, the axial edge of the sheet extending approximately to the axis of the bale and the peripheral edge of the sheet extending to the perimeter of the bale. And the sheet is preferably laid against the preceding mass, increment by increment, in such manner and with such pressure as to at once attain the full density which it is sought to impart to the completed bale. For convenience in description, such density may be termed "complete" density. Usually "complete" density should be approximately the highest density which the cotton can endure without injury. As already stated, the bat or sheet is preferably given an initial compression for the attainment of density and expression of air. When this is done, on being laid against the end of the bale-trunk the pressure required for the final compression to attain "complete" density, may be much reduced on account of such initial compression.

Since, as already indicated, the spiral sheet is progressively applied to or built upon the forming end of the bale or bale-trunk, the bale may be termed an "end-formed" or "end-built" bale. The operation of forming said sheet and bale will be more fully described by reference to the accompanying drawings. And it is to be noted that the operation of my improved machine is continuous or non-intermittent, the bale-forming mechanism running uninterruptedly without stopping to take in fibrous material or detach bales. Such continuous operation economizes power, and gives to the machine a high capacity.

An important feature in the operation of my press is the constant movement of the completed portion of the bale-trunk away from the five primary rolls, so that the action of said rolls upon the organization of the bale-trunk substantially ceases soon after the laying of the fiber sheets, and a given portion of the trunk is traversed by the hyperboloid rolls during only a few turns, and such rolls make only an idle, rolling engagement with the bale-trunk.

Figure 5:
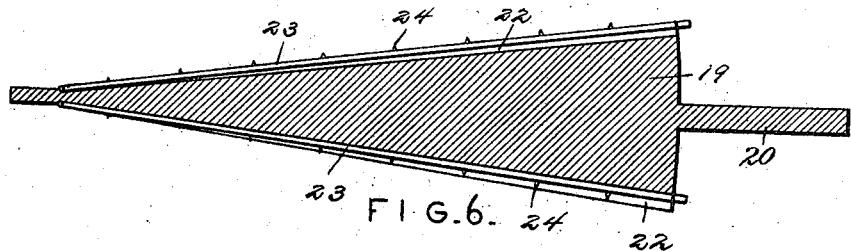
Figure 6:
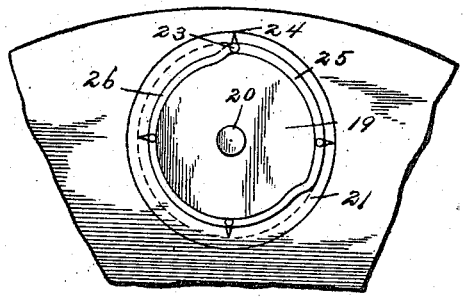
Figure 7:
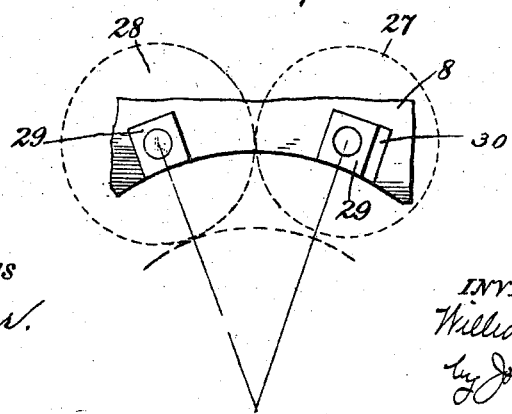
Figure 17:
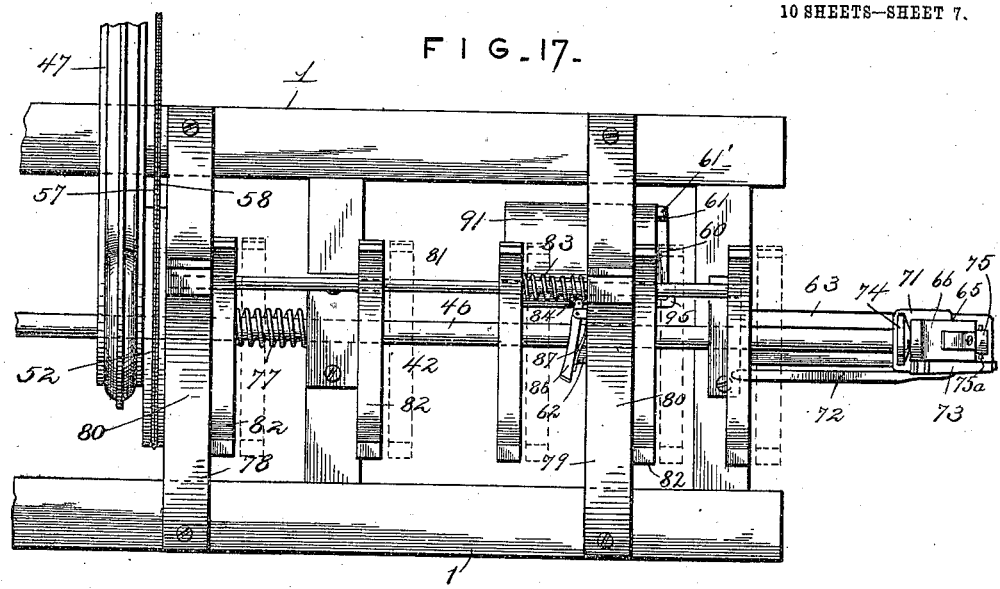
Figure 18:
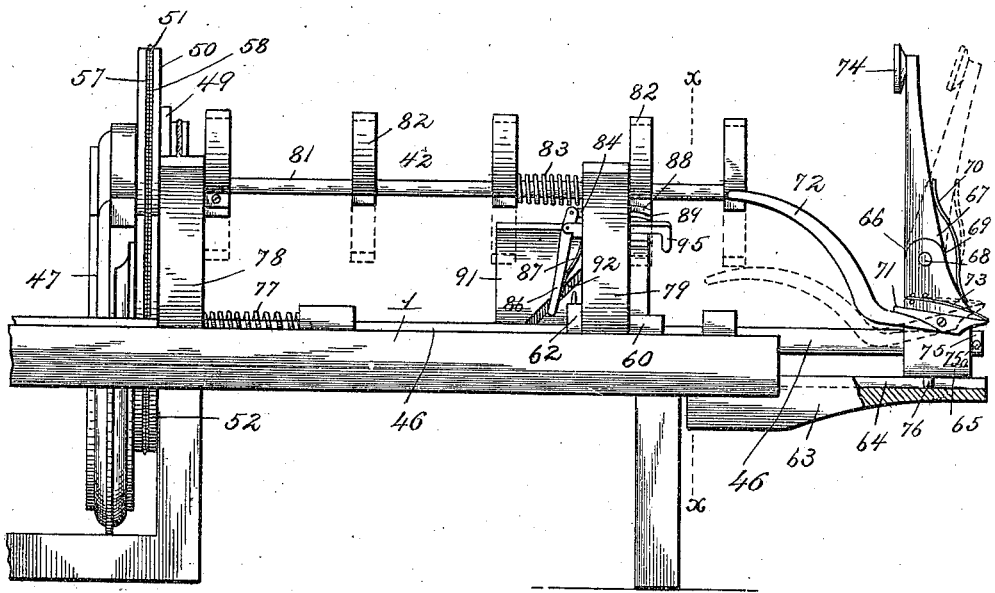

In the accompanying drawings, Figure 1ª is a side elevation of my improved machine; Fig. 1ᵇ is a sectional detail view showing the connection between the spherical sector and baling tube; Fig. 1ᶜ is a detail of a shifter for the belt which drives the bale-severing saw; Fig. 2 is a view looking into the mechanism that forms the cone end of the bale; Fig. 3 is a cross sectional view showing one set of cones; Fig. 3ª is an upright, transverse section through the hopper and conical bale-forming head; Fig. 4 is a side elevation of one of the feed cones; Fig. 5 is a longitudinal section thereof; Fig. 6 is a detail view of a cam for controlling the toothed bars of the feed rolls; Fig. 7 is a like view showing the journals of the primary and secondary cones; Figs. 8, 8ª and 8ᵇ are views of the cam plate that governs the discharge or delivery rack; Fig. 9 is a sectional detail view of a hyperboloid roller; Fig. 10 is a side view of the saw arm; Figs. 11 and 12 are views of a band saw tension adjuster; Figs. 13 and 14 are detail views of the severing saw; Figs. 15 and 16 are like views of the outer end of an arm whereby the saw-supporting shaft is turned; Figs. 17 and 18 are side elevations of the bale discharging mechanism; Fig. 19 is an end view of the machine; Fig. 20 is a cross section on the line X—X of Fig. 18; Fig. 21 is a side elevation of a bale-trunk formed by my improved press; Fig. 22 is an elevation of the left hand or forming end of the bale-trunk shown in Fig. 21; Fig. 23 is a sectional side elevation of a bale severed from the right hand end of the bale-trunk shown in Fig. 21; Fig. 24 is an end elevation of the bale shown in Fig. 23; Fig. 25 is an elevation of the forming end of a bale-trunk which is being formed by the simultaneous application of two spiral sheets or bats; Fig. 26 is a perspective view of sections of such two spiral sheets; Fig. 27 is a fragmentary section of the mechanism concerned in forming and laying the spiral sheet to form the bale.

Referring now to Fig. 27, I will describe the operation so far as it is performed by the particular form of mechanism illustrated by said figure. C is a cross section of a portion of the conical end of the bale-trunk; 28 is a conical primary roll positively rotated in the direction of the arrow; 27 is a conical secondary roll rotated at the same surface speed as the primary roll, 28, and bearing against the said roll, 28, at K. The primary roll bears upon the bale-trunk at J, while the secondary roll is of smaller diameter than the primary roll, so that it does not bear against the bale-trunk at all or with only immaterial pressure. Above the primary and secondary rolls is located a conical feed roll, 19, which is positively rotated in the direction of the arrow. Said feed roll is provided with suitable radial teeth, 24. Fixed walls, 9ª, are located at each side of the group of rolls, 28, 27, and 19. The space between said walls constitutes a slot in which said rolls are located and through which the cotton passes to the end of the bale-trunk. The right hand upper portion, I, of the left hand wall, 9ª, constitutes a breast which acts in conjunction with the feed roll, 19, and the space between said roll and said breast constitutes a throat. Above and upon the walls, 9ª, 9ª, and the feed roll, 19, rests an unorganized, heterogeneous, loose mass of cotton separated or isolated from the bale-trunk by the intervening abutment formed by said rolls and walls, 9ª. The rotation of the feed roll, 19, causes the teeth, 24, to draw or comb cotton fibers in a thin, sheet-form stream from said heterogeneous, loose mass and present the same to the primary and secondary rolls. The quantity of fiber in said stream depends upon the length, quality, and humidity or dryness of the cotton fiber, the length, form, and number of teeth, 24, the velocity of rotation of said feed roll, and the form of the breast, I, and its distance from the feed roll. Said breast constitutes a resistance to the advance of the fiber, and said resistance must be overcome by the combing or drawing action of the feed roll. The greater said distance, the greater the quantity of fiber entering into said sheet, and the less said distance, the thinner said sheet will be. Said sheet is drawn by the rolls, 28 and 27, and passed between the latter and along the face of the roll, 28, to the line of contact, J, between said roll and the end of the bale-trunk. Then said sheet becomes a part of the bale-trunk. The deposit of the sheet upon the bale-trunk may be effected by either the rotation of the bale-trunk or the revolution of the rolls, 28, 27, and 19, and the walls, 9ª, 9ª, around the bale-trunk axis. The arrow in the left hand portion of said Fig. 27 indicates the last-mentioned movement. Inasmuch as the said feed roll, primary roll, and secondary roll are conical, or substantially conical, the edge of the fiber sheet generated at the apex ends of said rolls is generated at a rapidity approximating zero, while from said apex edge there is a gradual increase of rapidity of generation approximately proportional to the rate of increase of the circumferences of said rolls from their apexes toward their bases.

The drawing or combing of the cotton from the heterogeneous or loose mass into the passage or throat between the feed roll and the breast, I, of the left hand wall, 9ª, tends to "parallel" and "draw" the fibers in much the same way as the card rolls of card engines operate to intertwine and concatenate the fibers. As already stated, the breast, I, acts as a resistance or obstruction to the passage of the fiber engaged by the feed roll. This facilitates the taking of uniform quantities of fiber by the teeth of the feed roll. While the stream or forming sheet is in engagement between the feed roll and the breast, I, it is also in engagement between the primary and secondary rolls and is by the action of the latter placed under tension which results in the "drawing" of said sheet in a manner similar to the action of drawing frames, whereby the fibers of the sheet are further "paralleled," and intertwined or concatenated. For the purpose of placing the sheet upon the end of the bale-trunk under tension and also further "drawing" the sheet, the surface velocity of the primary roll is made less than the orbital velocity of said roll, so that said roll will pull upon the sheet or bat while the latter is being laid. In other words, the orbital movement of the primary and secondary rolls, or the rotary receding movement of the bale-trunk, is a little more rapid than the generation of the spiral sheet. Hence there is a dragging, straining action upon the sheet as it is being laid upon the end of the bale-trunk. Such pulling or straining exerts a further "drawing" action upon the portion of the sheet or bat which is below the line of contact between the primary and secondary rolls.

I have already mentioned that an initial compression is, preferably, given to the sheet, whereby the air is expelled from the sheet and the sheet acquires a preliminary density. In the apparatus illustrated by Fig. 27, this initial compression is imparted by the rolls, 28 and 27, at the line of contact, K, between said rolls. It will be observed that such initial compression may be quite effective, for the sheet of fiber is thin and the compression is between narrow faces—practically lines—and both of said faces are hard faces. It has also been herein stated that the sheet or bat receives a final compression while it is being laid into its final position upon the end of the bale-trunk. This occurs when the sheet passes the contact line, J, between the primary roll and the end of the bale-trunk. As already herein stated, the pressure applied to the sheet while it is being laid need be only sufficient to attain "complete" density and this final pressure may be much reduced because of the density attained and retained by the "initial" compression. In other words, the density resulting from the manner of organizing the sheet and from the initial compression needs to be supplemented only by such final compression as will lead to complete density. And as already herein pointed out, the final compression necessary to lead to complete density may be relatively small, in view of the tension under which the bat or sheet is applied. Additional rolls, 28, may be arranged to bear upon the forming end of the bale-trunk, and by providing a plurality of sets of rolls, 28, 27, and 19, a plurality of sheets or bats may be formed at the same time and simultaneously applied to the end of the forming bale-trunk. In Fig. 25 I have shown the forming end of a bale-trunk with two spiral sheets being applied thereto. And Fig. 26 shows two such spiral sheets intertwined. In the machine as illustrated by Figs. 1 to 20, inclusive, five such sheets are simultaneously formed and applied to the end of the bale-trunk.

As more and more of the spiral sheet is added to the end of the bale-trunk, the latter and the abutment between the bale-trunk and the mass of unorganized cotton are relatively separated (forced from each other) in the direction parallel to the bale-trunk axis. Such separation should be proportional to the increments added to the end of the bale-trunk, in order that the pressure of the abutment upon the end of the bale-trunk may be uniform. This can be best accomplished by holding the bale-trunk with a yielding resistance; such resistance being adapted to be overcome when the desired degree of pressure by the abutment upon the portion of the sheet being laid is attained. For this purpose the bale-trunk is made to extend through a tubular passage the walls of which bear upon the bale-trunk. In the particular form of the machine illustrated by the drawings, said tubular passage is formed by a bale tube, a group of four oblique hyperboloid rollers, and a guide tube, said two tubes being axially in line, and said four hyperboloid rollers being set from said axial line a distance approximately equaling the radii of said tubes, and each of said rollers presenting toward said axial line a face parallel to said line and as long as the roller, said face being in position to bear upon the side of the bale-trunk. The nature and action of said rolls are such as that a cylindrical body lying between them and engaged thereby in such manner as to prevent slipping can not move longitudinally without also turning spirally on its own axis—a twisting movement. Said rolls constitute obliquely-yielding devices for resting the advance of the bale-trunk. For a fuller understanding of such rolls, I refer to the metal working art, wherein said rolls are used for forming and straightening tubes, rods, and shafts. It is to be observed that a cylindrical body may be passed through a group of such rolls by either of two means: (1) pushing the cylindrical body and letting the rolls turn idly in response to the pressure exerted by said body, (2) applying power directly to said rolls and thereby turning them and causing them to draw or pull said body with a spiral movement. In the operation of my press, during the forming of the bale-trunk, the latter is moved through said group of rolls by the former of said two methods, to-wit, by pressure exerted upon the forming end of said bale-trunk. But it is to be observed that if it should be desired to remove the entire bale-trunk from the press, this can be done by applying power directly to said rolls and positively turning them in the proper direction.

From the completed end of the bale-trunk—the end opposite the end to which the forming bat is applied—sections of proper length to constitute bales are severed periodically. Such severing may be accomplished by any suitable method or means. I prefer, however, to effect such separation by the removal of whole fibers of cotton throughout the plane of severance, in order that the ends of the bales may not contain mutilated fibers. The fibers thus removed may be added to the original unorganized mass and allowed to again enter the forming spiral sheet and the bale-trunk; or, if said fibers have become bruised or otherwise injured to a material extent, they may be put aside to be used as an inferior grade of cotton. It is to be observed that, if so desired, all of the bale-trunk may be detached or removed from the press as often as it attains the length desired for a bale.

The completed bale-trunk, or sections thereof, may be surrounded by any suitable extraneous binding or wrapping material or means for the sake of preserving the structure of the bale and for the sake of keeping the cotton from being bruised and soiled during handling or storage. I prefer to apply to such bale-trunk or bales a covering of cloth, D, under progressive radial pressure accompanied by strain or tension on the cloth, one end or edge of said cloth being pressed against the bale-trunk on a line parallel to the bale axis, and said line of pressure advanced around the bale while the portion of the cloth not yet applied to the bale is kept under tension. By this method, the perimeter surface of the bale, so far as it may be yielding, will be smoothed and pressed and the air expelled therefrom and the cloth closely laid or bound around the bale under tension. In the form of the machine herein illustrated, the bale is covered by a straight strip or sheet of cloth, D, laid obliquely or spirally to the bale axis, the side edges of the sheet of cloth overlapping.

The frame of my improved machine is designated by the numeral 1. This frame carries all the different mechanisms and these mechanisms will be described in their order, beginning at what I shall term the rear end of the machine where the cotton is first received and the formation of the bale begun, then describing the mechanism that recompresses the bale and winds the baling cloth thereupon, next describing the cut off or saw mechanism for severing the bale, and finally describing those mechanisms which deliver the completed bale.

At the rear end of the machine there is located a receiving hopper, 2, in the mouth of which are situated two receiving rollers, 3 and 4, which take the cotton lint between them, press it into a loose, unorganized sheet and discharge it into the conical portion, 5, of the hopper where it is taken up by certain mechanisms which will be described presently.

I will first describe the housing or casing for certain improved cone rollers for taking the fiber and forming it into a sheet, as described later on.

The numeral, 6, designates a shaft or spindle which is suitably journaled in a bearing, $6^a$, at the rear end of the machine— the end at which the fiber is taken into the machine. The forward portion of this shaft is formed into a spherical sector, 7, against which the smaller ends of the feed cones, 19, secondary cones, 27, and primary cones, 28, bear and in which they are journaled. The numeral, 8, represents a large hollow or concave spherical sector which is located in advance of the smaller sector. These two sectors are connected by a series of rigid dividing pieces, 9, which have inward projecting portions, 10, that pass down in between a primary cone, 28, of one set and a secondary cone, 27, of another set, said cones being spoken of more in detail later on. These dividing strips cover the primary and secondary cones, being suitably curved on their inner faces, but they leave the feed cones exposed, so that the latter reach the cotton in the conical portion, 5, of the hopper while the primary and secondary cones do not reach said cotton. From about the central portion of the machine there arises a massive but open frame work, 11.

A baling tube, 12, is formed rigid with and projects rearward from the frame work, 11, axially in line with the conical forming head, said tube being cylindrical and of any desired length and diameter. This tube determines the size of the round bale formed, the base ends of the primary and secondary rolls hereinafter described being set from the axis of said tube with reference to the wall of said tube, the primary cone projecting a little across the end of the tube wall. Encircling and secured to the baling tube is a gear girdle, 13, with which certain gears located on the spindle of the primary cones mesh, whereby all the cones are set in operation, as will appear more fully later on. The numeral, 14, designates an annulus which may be connected to or formed integral with this baling tube, 12, being located near the rear end thereof. On the extreme rear end of the tube there is located a screw threaded annulus, 15, and this end of the tube and the annulus are suitably concaved to conform to the rear, concave face of the large spherical sector, 8. This spherical sector is cut away on an incline as at 16 and screw threaded for the reception of an annulus, 17, which projects down in between the rear annulus, 15, and the front one, 14, on the baling tube. Owing to this peculiar construction it will be seen that the annulus, 15, on the baling tube and the annulus, 17, on the spherical sector, 8, can be removed whenever desirable, and the bale-forming mechanism quickly and easily removed. The large spherical sector is provided with a gear, 18, which meshes with a pinion, 18$^a$, located on a suitable drive shaft, 18$^b$.

I will first describe the feed cones or rollers which are located between the dividing pieces, 9. In the present instance I employ five of these feed cones, but it is obvious that as many could be employed as desirable, one being used for each set of primary and secondary cones.

The feed cones are designated by the numerals, 19, and they taper from their front ends toward their rear ends which latter are suitably journaled in the small spherical sector, 7. The forward journal, 20, is mounted for rotation in a screw threaded circular box, 21, which is received in the larger spherical sector. By removing the box, the feed rollers can be taken out whenever desirable. Each feed cone, 19, is provided with a series of longitudinally extending grooves, 22, which run from end to end thereof.

The numerals, 23, designate bars or rods which lie in the grooves of the feed rollers and are hinged at their rear ends to said rollers. Each bar is provided with a series of teeth, 24, and when said bar or rod is lying down in the groove the teeth are retracted so that their points do not project beyond the surface of the roller. It will be observed that the forward ends of the rods or bars project beyond the large end of the feed roller and are received in an irregular cam groove, 25, which is made in the rear face of the journal box, 21. This cam groove for the greater part is made in the form of a circle so that the teeth will be normally projected from the face of the feed cone and ready to gather in the cotton, but said cam groove is provided with a depression, 26, which serves to draw the hinged bar or rod with its teeth back into the groove immediately upon the cotton being presented to the primary and secondary cones now to be described.

The secondary cone is designated by the numeral, 27, there being as many of these secondary cones as there are feed rollers. It will be observed that no portion of these secondary cones project across the end of the baling tube.

The numerals, 28, designate the primary cones—so called because they are the chief compressing and bale forming cones. It will be seen that these primary cones are of somewhat greater diameter at their base than the secondary cones so that they project inwardly across the rear end of the baling tube for a purpose which will be described later on. The primary and secondary cones as well as the feed cones are arranged in sets and it will be observed that the primary and secondary cones of each set are normally in contact, one with the other, but the cones of the different sets are out of contact. The gearing which will be described later on is so arranged that the primary and secondary cones of each set turn toward each other so as to pass the cotton into the machine, but the feed cone revolves in the same direction as the primary cone, said feed cone being so disposed that it is adapted to deliver the cotton into the grasp of the primary and secondary cones. It is obvious that it is necessary that the primary and secondary cones have relative movement toward and away from each other to accommodate the different quantities of cotton which at different times are fed to them by the feed cone.

The numerals, 29, designate removable bearing boxes which receive the spindles of the respective primary and secondary cones. These boxes are received in slots made in the large spherical sector leading in from the inner edge thereof so that they can be taken out after the annulus, 17, has been removed from the sector. The opening for the reception of the bearing box of the spindle of each secondary cone is made somewhat larger for the reception of a removable rubber block or cushion, 30, which bears against the box and allows the secondary cone to move in relation to the primary cone. In place of this rubber block springs could be employed. On the spindle, 28$^a$, of each primary cone there is located a gear, 31, and on the spindle, 27$^a$, of each secondary cone there is located a gear, 32. The diameters of these gears are in the same ratio to each other as the diameters of the bases of the primary and secondary cones of the set, and hence it will be seen that said cones will revolve against each other with a rolling contact and a relative slipping will be prevented. The object of the secondary cone is to compress or condense the cotton against the primary cone as it is received from the feed cone so that all the air will be excluded. On the end of the spindle of each primary cone is located a gear, 33, which meshes with the gear girdle, 13. It will be observed that the cotton will be formed into a cone whose apex will lie toward the rear end of the machine and its base toward the front end thereof, the base of the cone being defined by the primary cones. If the diameter of the base of the cone of the cotton bale is in the ratio to the diameter of each primary cone as the diameter of the gear girdle is to the diameter of each gear, 33, there would be simply a rolling movement between the primary rollers and the cone formed at the end of the bale, the cone at the end of the bale acting the same as a cone roller would. This relation of parts, however, is not what is desirable and necessary in order to form the tightly compressed and condensed bale that I propose to make. Hence I make each gear, 33, somewhat larger so that all the primary cones will "lag" in relation to the cone formed on the end of the cotton bale. This arrangement is of peculiar importance inasmuch as the condensed sheets of cotton passing between the respective sets of rollers composed of primary and secondary cones while being formed into a cone at the end of the bale are kept under tension so that as the bale is formed it is made exceedingly dense, and it is at the same time advanced into the baling tube. Thus the layers on the cone end of the bale will be wound spirally and at the same time tightened and the bale projected or pushed into the baling tube, 12, with a spiral or twisting movement due to the turning action of the resisting hyperboloid rolls described below.

It is desirable to have the bases of the primary cones project slightly across the rear end of the baling tube so that the bale formed will be of somewhat less diameter than said baling tube, as when it is received in the tube it has a tendency to expand, not being subjected to the wrapping process, thereby allowing it to generate considerable friction so that twisting of the bale is resisted. Projecting from the face of the large spherical sector are a series of short spindles, 34. On each spindle there is loosely journaled speed gearing, 35, (consisting of two joined spur gear portions of different diameters) which meshes with a gear, 36, on the spindle, 20, of the feed cone, being driven by the gear, 33, on the spindle of the primary cone. (See Fig. 2.) Means are thus provided so that the feed cones, 19, will revolve considerably faster than the primary and secondary cones. The baling tube, 12, acts as a journal about which the cone system revolves, and furthermore, by frictional contact with the bale it resists the tendency of the same to rotate, thereby preventing it from being expelled before it has been properly formed by the cones. And said tube is a chamber or holder for the compressed material, and said cone system constitutes a cap or abutment extending across and closing one end of said tube or chamber.

I will now speak of the mechanism for recompressing the bale after it has left the baling tube so that said bale is again brought to the size it was when being delivered from the primary cones.

The numerals, 37, 38, 39, and 40, designate four hyperboloid comprising rollers which are journaled in suitable boxes, 37ª, connected to the upright portion, 11, of the machine frame, said rollers having their peripheries received in the open portions of the frame and being located in sets which are disposed in diametrical relation. Before describing these rollers, I will state that the front end of the upright frame is provided with a tubular bale guide, 41, which is of somewhat greater diameter than the baling tube, 12, said bale guide being adapted to receive the bale after it has undergone recompression by the hyperboloid rollers and the baling cloth has been wound around the bale and stitched. Referring now to the hyperboloid rollers, the axes of these rollers are, in the present instance, located at an angle of $26\frac{1}{2}$ degrees to the longitudinal axis of the bale, this angle being found by me to be the most desirable one in order to give a proper compression of the bale and allow the same to feed forward. However, this angle can be varied as practice will dictate, and furthermore, I will state that it is not absolutely necessary to employ four rollers, as two might do, but the best effects are obtained by employing the number of rollers stated. The curvature of the face of the hyperboloid rollers is governed by and directly dependent upon the angle formed between the axis of said rollers and the axis of the bale. The line of contact between the rollers and bale is longitudinal, being parallel with the axis of the bale, and hence diametrically opposite the roller on the opposite side, so that the pressure is properly applied. It will be seen that the axes of opposite rollers are not parallel but inclined from the axis of the bale in opposite directions, this being, of course, necessary. And yet the contacts with the bale are parallel with the bale axis and as long as the rolls. Furthermore the peripheries of these rollers project slightly across the front end of the baling tube so that the bale is again brought to its initial diameter. The hyperboloid roller as employed by me is peculiarly adaptable for this particular operation of recompression of the bale, as by means of sets of rollers disposed in the manner described, the bale can be properly compressed and yet allowed to have a spiral outward feed. It will also be observed that by the employment of the hyperboloid rollers which are located in sets disposed at diametrically opposite points, each set being at right angles to the other set, the difficulty heretofore experienced in making the round or cylindrical cotton bale is satisfactorily obviated inasmuch as the bale cannot bulge in any manner, being equally compressed at all sides.

The numeral, 42, designates a rack and 43 is a roll of baling cloth, D, which roll is journaled in said rack. The rack and roller are so arranged that the longitudinal axis of the latter is disposed in parallel relation to the axis of the upper hyperboloid roller so that the baling cloth will be properly fed in a spiral direction in relation to the longitudinal axis of the bale. Any preferred form of tension device, 44, can be employed to give the baling cloth the proper tension. It is generally preferable to provide each hyperboloid roller with sets of teeth, 45, (Figs. 1ª and 9) which will engage with the bale and prevent any longitudinal slipping of the same. If desirable, friction can be applied to the ends of the hyperboloid rollers or to their axles so they may be retarded to any desired extent to insure proper recompression of the bale and the winding of the baling cloth.

I have not shown any mechanism for stitching the edges of the lap of the baling cloth immediately after it passes from under the upper hyperboloid roller. However, any preferred form of stitching mechanism can be readily applied to the upper frame, 11, to carry on this operation. Any of the stitching machines now in use could, by slight changes be made perfectly adaptable to this work and hence I have not deemed it necessary to either show or describe in detail stitching mechanism. I will now pass to a description of my automatically-operated cut-off or saw mechanism for cutting off a length of the continuous bale which is constantly being formed while the machine is in operation. A description will also be given of a novel form of delivery rack or carriage which receives the bale and automatically delivers it, and I will also describe certain other coöperating mechanisms.

At 46 is shown what I shall term a saw shaft. This shaft extends longitudinally of the machine, being adapted to turn in suitable bearings of the machine frame as well as to slide longitudinally of the machine frame in said bearings.

At 47 is shown a curved saw arm which is rigidly secured on the saw shaft. On a spindle, 48, projecting from a slidable tension adjuster, 49, is journaled a band-saw pulley, 50, which is provided with a groove, 51, in its periphery.

The numeral, 52, designates a band-saw pulley which is loosely journaled on the saw shaft, 46, being provided with a groove for the saw, 57, and being formed with a belt pulley, 53, rigid with the pulley, 52. The numeral, 54, designates a loose pulley which lies adjacent to said fixed pulley and abuts against a collar, 55. A belt, 56, shiftable on the pulleys, 53 and 54, transmits power to the saw. Any suitable belt shifter is arranged to shift said belt. Such a shifter is illustrated by Fig. 1ᶜ. An arm, 55ª, is pivoted between its ends to a bracket, 55ᵇ, on the frame, 1. The upper end of said arm has a notch, 55ᶜ, which receives the edge of the collar, 55. The lower end of said arm is hinged at 55ᵈ, to an arm, 55ᵉ, the lower end of which is hinged at 55ᶠ, to the frame, 1. The upper end of said arm has a slot, 55ᵍ, for receiving the belt, 56, (Fig. 1ª). When the shaft, 46, and the collar, 55, move from their position of rest toward the right, the upper end of the arm, 55ª, is carried to the right, and the lower end of said arm is moved toward the left; and such movement of the lower end of said arm forces the upper end of the arm, 55ᵉ, toward the left, the latter carrying the belt in the same direction from the loose pulley, 54, to the fixed pulley, 53. And when the shaft, 46, and collar, 55, again move toward the left, the movements of the arms, 55ª and 55ᵉ, are reversed. The saw as shown in Fig. 13 is flattened in cross section and provided with two parallel rows of fine teeth, 58, and the saw runs in the grooves of the pulleys, 51 and 52, heretofore described. In Fig. 14, the saw has a body which is oval in cross section. This form of saw is perfectly adaptable for the work to which it is subjected. It does not cut the fibers of the cotton but separates them and it will not burn the cotton in any manner. An ordinary band-saw is not well adapted for sawing off the bale, and hence I have designed the saw just described which properly accomplishes its work.

The numeral, 59, designates a rotary cleaning brush which is journaled on a spindle, 59ª, projecting from the saw arm, 47, and lies immediately below the band-saw so that its bristles project in between the rows of teeth of the latter and at all times remove any cotton that may adhere to the saw. A belt, 59ᵇ, extends around a pulley, 50ª, on the side of the pulley, 50, and a pulley, 59ᶜ, on the side of the brush, 59, transmits motion from the pulley, 50, to the brush.

A cam arm, 60, is secured to the saw shaft, 46, being provided with a pin, 61, on its free end, the pin being sheathed with a roller, 61'. The numeral, 62, designates a tripping finger which is also secured to the shaft but is located in the rear of the cam arm, 60.

The numeral, 63, designates a guide which projects from the front end of the machine, being provided with a longitudinally-extending slot, 64. On the adjacent end of the saw shaft, 46, is located what I shall term an end standard. This end standard is composed of a base, 65, and an arm, 66, which latter is provided with a tongue, 67, that is received in the bifurcated upper portion of the base, being journaled on a pin, 68. These two parts are so disposed that the hinged arm is adapted to rock back only a given distance as both it and the base are provided with abutments, 69, which engage.

The numeral, 70, designates a ribbon spring which is connected to the base and has its free upper end pressing against the arm, 66.

The numeral, 71, designates a U-shaped stirrup which is hinged to the base, 65, and projecting from and connected to this stirrup is a curved rack lifter arm, 72.

The numeral, 73, designates a ribbon spring which has one end connected to the base, 65, and its free end pressing against a forward-extending portion of the stirrup, 71, so that the cross piece of said stirrup is normally held raised and extended across the tongue of the hinged arm, 66, whereby the latter is held locked, and also the curved lifting arm, 72, is kept raised and pressing against the delivery rack which will be described later on, so that said rack is held normally up. At the upper end of the standard arm, 66, there is located a rotating disk, 74, against which the forward end of the bale abuts, said disk being made to rotate to adapt itself to the rotation of the bale. It will be seen that the forward end of the saw shaft is reduced as at 75 and the base is loosely received thereon, an ordinary pin, 75ª, being extended through the shaft, 46, to hold the base, 65, in position. A pin, 76, projects from the base down into the slot, 64, in the guide, 63. Hence it will be seen that as the shaft moves forward and longitudinally of the machine, the end standard will be also moved parallel to the length of the machine, but it cannot turn in any manner.

The numeral, 77, designates a powerful coil spring which encircles the saw shaft, 46, being adapted to keep the saw normally pushed in toward the rear end of the machine, and said spring leaving the saw shaft free to turn in either direction for the purposes hereinafter described.

Formed integral with or connected to the front portion of the machine frame are two transverse bridges, 78 and 79, which extend across the machine from side to side, being provided with compound curved inclined faces, 80, so that the bale will readily roll down these faces and off at the side of the machine after it has been delivered from the rack.

The numeral, 81, represents the shaft of the delivery rack which is journaled in the highest portion of the bridges (at the side of the upright middle plane of the machine toward the saw arm, 47) and is adapted both for a turning and a longitudinal movement. This shaft carries a series of curved arms, 82, so that a rack is provided which is adapted for the reception of the bale. The numeral, 83, designates a coil spring which encircles said shaft and is interposed between an arm, 82, thereof and the bridge, 79, so that the rack is normally pushed toward the rear of the machine (toward the left, as viewed in Figs. 17 and 18). This spring has its rear end connected to the adjacent arm, 82, and its other end fastened to the bridge, 79, and it, therefore, serves as a torsion spring to keep the rack raised.

The numeral, 84, (Figs. 17, 18, and 19) designates a locking bolt which is slidable on the bridge, 79, and is adapted to be projected back of the adjacent arms, 82, of the rack, so that the rack is normally held in the raised position. A lever, 86, is pivotally connected to this bolt as well as to the bridge, 79, and is normally pressed toward the rear of the machine by a spring, 87, so that said locking bolt is in engagement with the rack. This lever is adapted to be tripped by the tripping finger, 62, fixed on the shaft, 46, as above described. The under face of the rack arm, 82, next the bridge, 79, is provided with a spirally arranged or oblique cam, 88, which has an upper face, 89, and a lower face, 90. The respective faces of the cam are adapted for engagement with the roller, 61', of the cam arm, 60, as will appear more fully later on, said roller being long enough to extend into the path of said cam and also into the cam groove described below. The numeral, 91, designates a curved plate which is provided with an upward and forward extending spiral cam groove, 92, in which the roller of said cam arm is adapted to move. (Figs. 1, 8, 8ª, 8ᵇ, 17, 18, 19, and 20.) The upper portion of said cam groove leads into a short, longitudinally-extending groove portion, 93, in which the roller of the cam arm is also adapted to work and which extends by the cam, 88, a little below the normal position of said cam, so that said cam is above the roller, 61', when the latter is in the forward end of the groove portion, 93.

The numeral, 94, (Figs. 8, 8ª, and 8ᵇ) designates a finger which is connected to the upper portion of the plate, 91, and is bent downward in substantially parallel relation to the forward end of said plate as shown at 95. There are two gates designated by the numerals, 96 and 97, respectively, the former being a long gate and the latter somewhat shorter. These gates are pivoted on a single pin, 98, and they are adapted to remain dropped by gravity, the longer gate extending out to the end of the curved plate to prevent the roller of the cam arm from coming back into the portion, 93, of the groove, while the shorter gate is adapted to close behind the roller and prevent it from dropping back into the spiral cam groove, 92. At the lower end of said spiral cam groove there is located a downward-extending curved spring gate, 99, which guides the roller on the cam arm into the cam groove.

In order to normally lock the rack against longitudinal movement, I provide a locking pin, 100, which fits into a recess in the back of the rack arm, 82, at the right of the bridge, 79.

When the end of the bale strikes the end of the standard it pushes the same, thereby drawing the saw shaft longitudinally in its bearings. When this is happening the roller of the cam arm, 60, begins to ride upward in the spiral cam groove, 92, thereby elevating the saw arm and its saw and giving them the same spiral, forward-advancing movement as that of the cam arm itself, so that the saw will begin to cut through the bale directly at right angles to the longitudinal axis thereof. Immediately upon the saw having cut through the bale the tripping finger, 62, (on the shaft, 46) comes into engagement with the lever, 86, pressing the same against the action of its impelling spring and retracting the locking bolt, 84, thereby allowing the delivery rack to fall under the weight of the bale. However, when this tripping operation is brought about, the roller of the cam arm has passed along the longitudinally extending portion, 93, of the cam groove, 92, and beneath the cam, 88, and the shorter gate, 97, has been pushed aside by said roller and dropped by gravity behind the latter, so that downward entrance of the spiral cam groove, 92, is prevented. Said roller now stands at a slight distance from the forward end of said short gate (the roller having passed said gate to allow the latter to fall by gravity), and, as above stated, the roller is beneath the cam, 88. Hence, said cam must pass said roller during the downward movement of the rack. The parts are so spaced and proportioned as to allow enough downward movement of the rack to cause the latter to be freed from the locking pin, 100, before said cam strikes said roller. The downward movement of the rack arm bearing said cam depresses the arm, 72, and, through the latter, the stirrup, 71, whereby the portion, 66, of the standard is unlocked and allowed to turn forward (toward the right as viewed in Figs. 1ª and 18). Immediately upon such unlocking, the spring, 77, on the saw shaft, 46, draws said shaft rearward (toward the left as viewed in Figs. 1ª and 18), the shaft being now free for such movement, notwithstanding the pressure of the bale end against the disk, 74. Such rearward movement extends only through the slight distance between said roller and the free end of the short gate, said gate forming an abutment for said roller. This causes the band saw to pass slightly back over the stub from which the bale has been cut off. When the rack has dropped far enough to cause the oblique cam, 88, to bear by its lower face, 90, upon said roller, said cam tends to press said roller sidewise in the direction of said small gate. But, since said roller bears against said gate, said roller forms a fixed abutment for the cam, and the latter can pass said roller only by moving forward (toward the standard), carrying the rack and bale in the same direction, the standard yielding to the pressure of the end of the bale. In this manner, the bale is, during its discharge movement, carried a little distance away from the bale-trunk. But when the cam, 88, has passed the roller, the rack is again drawn backward, whereby the cam is brought beneath the roller.

The rack is pressed downward by the weight of the bale until the latter bears upon the inclined faces, 80, of the bridges and rolls from the latter, leaving the rack free to rise in response to the torsion action of the spring, 83. But the roller, 61′, is again in the path of the cam, and the rack can not rise to its normal position without being diverted or moving the roller out of its path. The upper oblique face, 89, of the cam now bears against the roller, so that if said cam is to be diverted, it must move in the direction of the small gate (toward the left as viewed in Figs. 1ª and 18); but the rack arm, 82, bears against the adjacent bridge and prevents movement in that direction. However, the roller is free to move in the opposite direction and it is given such movement by said cam, the torsion action of the spring, 83, being in excess of the pushing or expanding action of the spring, 77, on the shaft, 46, (the pushing of said spring, 77, on said shaft, 46, toward the left as viewed in Figs. 1ª and 18). The relative dimensions and arrangement of these parts are such as that before the cam passes said roller, the latter is pushed entirely out of the longitudinal portion, 93, of the cam groove, allowing the long gate to fall behind said roller. Then said roller is free to move downward along the adjacent end of the curved plate, 91. And this movement has brought the saw forward past the front end of the stub of the bale-trunk, so that the saw has a clear way to turn transversely across the path of the bale. And the saw arm, 47, and the cam arm, 60, now turn downward by gravity, turning the saw shaft, 46, said arms being always at one side of the longitudinal, upright plane of said shaft. As soon as the roller, 61', reaches the lower edge of the plate 91, the spring 77, forces the shaft, 46, and the saw arm, cam arm, and tripping finger, 62, forward into their normal positions, the roller, 61', standing at the rear of the gate, 99, ready to again move upward in the cam groove, 92, of the plate, 91. During such return movement, the tripping finger leans in the same direction as the saw arm and the cam arm, 60, and clears the lever, 86, which controls the locking bolt, 84. The return of said lever and bolt is effected by the spring, 87, after the rack arm, 82, has passed downward. During the return movement of the rack, said arm pushes said bolt endwise, the end of the bolt or the side of the arm, or both, being oblique for this purpose. After the cam, 88, has passed the roller, the upward movement of the rack continues until its normal position is assumed, the locking pin, 100, again engaging the rack against endwise movement toward the standard and the locking bolt, 84, again engaging the rack against downward movement. And upon the rising of the rack, the arm, 66, of the standard, the stirrup, 71, and the arm, 73, are returned to their normal positions by the springs associated therewith, whereby the standard is again locked.

My improved automatic baler just described accomplishes that which has never before been done in the art to which my invention appertains so far as I am aware, and as it is entirely automatic in its action with the single exception of originally starting the baling cloth around the continuous bale, much time and labor are saved with its use while the expense is greatly lessened, and a more perfect bale obtained than has heretofore been possible.

Various slight changes in the different parts of my improved machine might be made by any one skilled in the art to which my invention appertains without detracting from any of the advantages of its many novel features when viewed in their broad aspect, and hence I am to be understood as considering myself entitled to all such varied constructions as come properly within the spirit and scope of my invention.

The bale herein described is made the subject-matter of my co-pending application, Serial No. 74,985, filed September 10, 1901, as a division of this application.

I claim as my invention:

1. The combination of a receiver, a substantially conical abutment, a slot or slots in such abutment through which the material is fed, and means for relatively rotating the receiver and the abutment, substantially as described.

2. The combination of a receiver and means for forming a bale in a series of nested self-binding layers, substantially as described.

3. In a baling press, an abutment having a working face of substantially conical form, and a feeding orifice in said abutment, substantially as described.

4. In a press for fibrous material, the combination of an abutment having a series of inclined conical rollers, means for relatively rotating said abutment and the forming bale, and means for rotating said rollers, substantially as described.

5. An abutment for baling presses having a series of inclined rollers and means for rotating said rollers about their axes, the angle of inclination being such that the fibrous material will be formed in a series of nested self-binding layers.

6. In a bale press, a series of rollers arranged to form a substantially conical abutment, and means for rotating said rollers, substantially as described.

7. In a bale press, a series of rollers arranged to form a substantially conical abutment, means for rotating said rollers and scrapers adjacent to said rollers, substantially as described.

8. In a press for forming bales of fibrous material, the combination of a series of rollers arranged to form a substantially conical abutment, means for rotating said rollers, and a resistance for the forming bale, substantially as described.

9. In a machine of the class described, a head plate having a feed slot, bat forming rolls mounted on said head plate, and means for simultaneously revolving the head plate with the rolls about a central axis and at the same time rotating the rolls.

10. In an apparatus substantially as described, a revoluble head plate and a bale receiving chamber under the plate, said head plate having a radial slot, in combination with bat forming rolls mounted on the head plate, and means for imparting motion to the said rolls, and at the same time imparting a sweep movement of the rolls on the head plate, about the central axis of the baling chamber.

11. In a cotton press of the character described, the combination with the stationary receiving chamber, said chamber having an annular cog rim; of bat forming rolls mounted over the said chamber, said rolls being geared together, and having a drive gear for engaging the cog rim of the stationary chamber, and means for revolving the rolls horizontally around the axis of the said chamber.

12. In an apparatus for compressing fibrous or other material, the combination with compressing mechanism, of bale-detaching devices yieldingly mounted with reference to said mechanism, and means for actuating said devices, as and for the purpose set forth.

13. In an apparatus for compressing fibrous or other material, the combination with compressing mechanism, of a support yieldingly mounted with respect to said compressing mechanism, bale-detaching devices mounted upon said support, and means for actuating said devices, as and for the purpose set forth.

14. In a machine for compressing fibrous materials, in combination, means for compressing the fiber into a column, and means for automatically severing a section from the column when the latter has reached a predetermined size.

15. In a machine for compressing fibrous materials, in combination, means for compressing the fiber into a column; means for severing a section from the column; and means controlled by the column for automatically operating said severing means when the column has reached a predetermined size.

16. In a baling apparatus, the combination with a cutter for the baled material, of driving means normally disconnected from the cutter, and automatic means for connecting the driving means with the cutter at the proper time.

17. In a baling apparatus, means for forming a rotating and endwise moving bale-column, a cutter movable through the bale-column and also longitudinally thereof, and automatic means for operating the cutter and for returning the same to its normal position.

18. In a machine for compressing fibrous or other material, a chamber or holder for the compressed material, a cap for one end of said chamber, said cap forming an abutment for the compressed material, means for relatively moving said chamber and cap, said cap provided with a plurality of openings provided with mechanism for forming the material into spiral sheets and passing said sheets through said openings, substantially as described.

19. In a press for baling fibrous material, the combination of an abutment having opposing conical rollers, means for relatively rotating said abutment and the forming bale, and means for rotating said rollers, substantially as described.

20. In a press for baling fibrous material, the combination of an abutment having inclined opposing conical rollers, means for relatively rotating said abutment and the forming bale, and means for rotating said rollers, substantially as described.

21. In a press for baling fibrous material, the combination of an abutment having a series of pairs of opposed conical rollers, means for relatively rotating said abutment and the forming bale, and means for rotating said rollers, substantially as described.

22. In a press for baling fibrous material, the combination of an abutment having a series of pairs of opposed inclined conical rollers, means for relatively rotating said abutment and the forming bale, and means for rotating said rollers, substantially as described.

23. In a bale press, a series of pairs of opposing rollers arranged to form a substantially conical abutment, and means for rotating said rollers, substantially as described.

24. In a bale press, a series of pairs of opposing rollers arranged to form a substantially conical abutment, means for rotating said rollers, and scrapers adjacent to said rollers, substantially as described.

25. In a press for forming bales of fibrous material, the combination of an abutment having opposing conical rollers, means for relatively rotating said abutment and the forming bale, means for rotating said rollers, and a resistance for the forming bale, substantially as described.

26. In a press for forming bales of fibrous material, the combination of an abutment having a series of pairs of opposing conical rollers, means for relatively rotating said abutment and the forming bale, means for rotating said rollers, and a resistance for the forming bale, substantially as described.

27. In a press for forming bales of fibrous material, the combination of a series of pairs of opposing conical rollers arranged to form a substantially conical abutment, means for rotating said rollers, and a resistance for the forming bale, substantially as described.

28. In a machine of the class described, a head-plate having a feed slot, bat-forming rolls mounted upon said head-plate, means for relatively rotating said head-plate and the forming bale and at the same time rotating said rolls, substantially as described.

29. In an apparatus substantially as described, a head-plate and bale-receiving chamber, said head-plate and said chamber being axially in line and relatively rotatable, and said head-plate having a radial slot, in combination with bat-forming rolls mounted on the head-plate, and means for imparting motion to said rolls, substantially as described.

30. In a press of the character described, the combination with a receiving chamber, said chamber having an annular cog rim, and a head-plate, said head-plate and said chamber being relatively rotatable, of bat-forming rolls mounted upon said head-plate, said rolls being geared together and having drive gear for engaging the cog rim of said chamber, substantially as described.

31. In a press of the class described, the combination with the baling chamber, of a series of conical compressing rollers coöperating with said chamber, means for relatively rotating said series of rollers and said chamber around their common axis, and means for causing an independent positive rotation of said rollers at a speed different from the normal orbital speed, substantially as described.

32. In a press of the class described, the combination with the baling-chamber, of a series of conical compressing rollers coöperating with said chamber, means for relatively rotating said series of rollers and said chamber around their common axis, and means for causing an independent positive rotation of said rollers at slightly less than normal orbital speed, substantially as described.

33. In a press of the class described, a fixed baling chamber, a revoluble roller-carriage arranged at the head of said chamber, a series of conical compressing-rollers carried by said carriage, means for imparting a rotary movement to the carriage, and means actuated by the movement of the revoluble carriage for imparting an independent positive rotation to the individual rollers at slightly less than normal orbital speed to cause them to draw the fiber sheets while being applied to the forming bale, substantially as described.

34. In a press of the class described, the combination with a fixed supporting-frame, of a stationary circular rack and a baling-chamber, a revoluble roller-carriage, means for relatively rotating said series of rollers and said chamber around their common axis, and a series of conical rollers supported by the carriage and carrying individual driving-gears in operative relation with said rack and caused to roll by the movement of the carriage, but at slightly less than normal orbital speed, substantially as set forth.

35. In a press of the character described, the combination with the baling-chamber, of a compressing head arranged over said chamber, a circular series of conical rollers supported by said head, means for causing a relative rotation between the baling chamber and head, means actuated by the rotatable press head for rotating the rollers at slightly less than normal orbital speed, substantially as described.

36. In a cotton or other press, an open-ended receiving-chamber and a slotted head-plate in combination with means for reducing the material into a thin spiral bat or sheet, and simultaneously feeding it through the slotted head-plate into the receiving-chamber and subjecting the same to pressure, said means including a pair of opposed rolls and a support therefor revoluble about the axis of the receiving-chamber, substantially as set forth.

37. In a cotton or other press, means for reducing the loose material into a thin spiral bat or sheet, and laying said sheet in spiral, superimposed end laps, said means including a pair of opposed rolls, and means for rotating them relatively to each other and revolving both around a central axis, substantially as set forth.

38. In a press for baling fibrous material, mechanism for supporting the forming bale-trunk, mechanism for drawing a thin, substantially continuous and uniform sheet-spiral stream of fibers from a mass of loose fibrous material and pressing the resulting spiral sheet under strain, increment by increment, spirally upon the end of the forming bale-trunk, substantially as described.

39. In a press for baling fibrous material, mechanism for supporting the forming bale-trunk, mechanism for drawing a thin, substantially continuous and uniform sheet-spiral stream of fibers from a mass of loose fibrous material, subjecting the resulting sheet to an initial compression and then finally, by a compression distinct from said initial compression, compressing the sheet, increment by increment, spirally upon the end of the forming bale-trunk, substantially as described.

40. In a press for baling fibrous material, mechanism for supporting the forming bale-trunk, mechanism for drawing a thin, substantially continuous and uniform sheet-spiral stream of fibers from a mass of loose fibrous material, subjecting the resulting sheet-spiral to an initial compression, and thereafter, by a compression distinct from said initial compression, pressing said sheet, increment by increment and under strain, spirally upon the end of the forming bale-trunk, substantially as described.

41. In a press for baling fibrous material, mechanism for supporting the forming bale-trunk, mechanism for drawing a thin, substantially continuous and uniform sheet-spiral stream of fibers from a mass of loose fibrous material, subjecting the resulting sheet to an initial compression, placing and maintaining said sheet under tension from said initial compression and finally, by a compression distinct from said initial compression, compressing the sheet, increment by increment, spirally upon the end of the forming bale-trunk, substantially as described.

42. In a press for baling fibrous material, mechanism for supporting the forming bale-trunk, mechanism for drawing a plurality of thin, substantially continuous and uniform sheet-spiral streams of fibers from a mass of loose fibrous material, and pressing the resulting spiral sheets under strain, increment by increment, spirally upon the end of the forming bale-trunk, substantially as described.

43. In a press for baling fibrous material, mechanism for supporting the forming bale-trunk, mechanism for drawing a plurality of thin, substantially continuous and uniform sheet-spiral streams of fibers from a mass of loose fibrous material, subjecting the resulting sheets to an initial compression and then finally, by a compression distinct from said initial compression, compressing the sheets, increment by increment, upon the end of the forming bale-trunk, substantially as described.

44. In a press for baling fibrous material, mechanism for supporting the forming bale-trunk, mechanism for drawing a plurality of thin, substantially continuous and uniform sheet-spiral streams of fibers from a mass of loose fibrous material, subjecting the resulting spiral sheets to an initial compression, and thereafter, by a compression distinct from said initial compression, pressing said sheets, increment by increment, and under strain, spirally upon the end of the forming bale-trunk, substantially as described.

45. In a press for baling fibrous material, mechanism for supporting the forming bale-trunk, mechanism inclined to the press axis for drawing a thin, substantially continuous and uniform sheet-spiral stream of fibers from a mass of loose fibrous material and expelling the air from and pressing the resulting spiral sheet, increment by increment, spirally upon the end of the forming bale-trunk, and said sheet being by said mechanism inclined to the bale-trunk axis, whereby the convolutions of said sheet assume conoidal form and become nested, substantially as described.

46. In a press for baling fibrous material, mechanism for supporting the forming bale-trunk, mechanism inclined to the press axis for drawing a thin, substantially continuous and uniform sheet-spiral stream of fibers from a mass of loose fibrous material, and pressing the resulting spiral sheet under strain, increment by increment, spirally upon the end of the forming bale-trunk, and said sheet being by said mechanism inclined to the bale-trunk axis, whereby the convolutions of said sheet assume conoidal form and become nested, substantially as described.

47. In a press for baling fibrous material, mechanism for supporting the forming bale-trunk, mechanism inclined to the press axis for drawing a thin, substantially continuous and uniform sheet-spiral stream of fibers from a mass of loose fibrous material, subjecting the resulting sheet to an initial compression and then finally, by a compression distinct from said initial compression, compressing the sheet, increment by increment, spirally upon the end of the forming bale-trunk, and said sheet being by said mechanism inclined to the bale-trunk axis, whereby the convolutions of said sheet assume conoidal form and become nested, substantially as described.

48. In a press for baling fibrous material, mechanism for supporting the forming bale-trunk, mechanism inclined to the press axis for drawing a thin, substantially continuous and uniform sheet-spiral stream of fibers from a mass of loose fibrous material, subjecting the resulting spiral sheet to an initial compression, and thereafter, by a compression distinct from said initial compression, pressing said sheet, increment by increment and under strain, spirally upon the end of the forming bale-trunk, and said sheet being by said mechanism inclined to the bale-trunk axis, whereby the convolutions of said sheet assume conoidal form and become nested, substantially as described.

49. In a press for baling fibrous material, mechanism for supporting the forming bale-trunk, mechanism inclined to the press axis for drawing a thin, substantially continuous and uniform sheet-spiral stream of fibers from a mass of loose fibrous material, subjecting the resulting sheet to an initial compression, placing and maintaining said sheet under tension from said initial compression and finally, by a compression distinct from said initial compression, compressing the sheet, increment by increment, spirally upon the end of the forming bale-trunk, and said sheet being by said mechanism inclined to the bale-trunk axis, whereby the convolutions of said sheet assume conoidal form and become nested, substantially as described.

50. In a press for baling fibrous material, mechanism for supporting the forming bale-trunk, mechanism inclined to the press axis for drawing a plurality of thin, substantially continuous and uniform sheet-spiral streams of fibers from a mass of loose fibrous material and expelling the air from and pressing the resulting sheets, increment by increment, spirally upon the end of the forming bale-trunk, and said sheets being by said mechanism inclined to the bale-trunk axis, whereby the convolutions of said sheets assume conoidal form and become nested, substantially as described.

51. In a press for baling fibrous material, mechanism for supporting the forming bale-trunk, mechanism for drawing a thin, substantially continuous and uniform sheet-spiral stream of fibers from a mass of loose fibrous material, and pressing the resulting spiral sheet under strain, increment by increment, spirally upon the end of the forming bale-trunk, and mechanism for transversely severing the completed portion of said bale-trunk, substantially as described.

52. In a press for baling fibrous material, mechanism for supporting the forming bale-trunk, mechanism for drawing a thin, substantially continuous and uniform sheet-spiral stream of fibers from a mass of loose fibrous material, subjecting the resulting sheet to an initial compression and then finally, by a compression distinct from said initial compression, compressing the sheet, increment by increment, spirally upon the end of the forming bale-trunk, and mechanism for transversely severing the completed portion of the bale-trunk, substantially as described.

53. In a press for baling fibrous material, mechanism for supporting the forming bale-trunk, mechanism for drawing a thin, substantially continuous and uniform sheet-spiral stream of fibers from a mass of loose fibrous material, subjecting the resulting spiral sheet to an initial compression, and thereafter, by a compression distinct from said initial compression, pressing said sheet, increment by increment and under strain, spirally upon the end of the forming bale-trunk, and mechanism for transversely severing the completed portion of the bale-trunk, substantially as described.

54. In a press for baling fibrous material, mechanism for supporting the forming bale-trunk, mechanism for drawing a thin, substantially continuous and uniform sheet-spiral stream of fibers from a mass of loose fibrous material, subjecting the resulting sheet to an initial compression, placing and maintaining said sheet under tension from said initial compression and finally, by a compression distinct from said initial compression, pressing the sheet, increment by increment, spirally upon the end of the forming bale-trunk, and mechanism for transversely severing the completed portion of the bale-trunk, substantially as described.

55. In a press for baling fibrous material, mechanism for supporting the forming bale-trunk, mechanism for drawing a plurality of thin, substantially continuous and uniform sheet-spiral streams of fibers from a mass of loose fibrous material, and pressing the resulting spiral sheets under strain, increment by increment, spirally upon the end of the forming bale-trunk, and mechanism for transversely severing the completed portion of said bale-trunk, substantially as described.

56. In a press for baling fibrous material, mechanism for supporting the forming bale-trunk, mechanism for drawing a thin, substantially continuous and uniform sheet-spiral stream of fibers from a mass of loose fibrous material and expelling the air from and pressing the resulting spiral sheet, increment by increment, spirally upon the end of the forming bale-trunk, and mechanism for simultaneously with the application of said spiral sheet to the bale-trunk surrounding the bale-trunk progressively with extraneous binding means, substantially as described.

57. In a press for baling fibrous material, mechanism for supporting the forming bale-trunk, mechanism for drawing a thin, substantially continuous and uniform sheet-spiral stream of fibers from a mass of loose fibrous material and expelling the air from and pressing the resulting spiral sheet, increment by increment, spirally upon the end of the forming bale-trunk, and mechanism for simultaneously with the application of said spiral sheet to the bale-trunk applying radial pressure to the perimeter of the bale-trunk, and mechanism for simultaneously with the application of such radial pressure applying cover fabric to said bale-trunk under pressure, substantially as described.

58. In a press for baling fibrous material, mechanism for supporting the forming bale-trunk, mechanism for drawing a thin, substantially continuous and uniform sheet-spiral screen of fibers from a mass of loose fibrous material and expelling the air from and pressing the resulting spiral sheet, increment by increment, spirally upon the end of the forming bale-trunk, and mechanism for simultaneously with the application of said spiral sheet to the bale-trunk applying radial pressure to the perimeter of the bale-trunk, and mechanism for simultaneously with the application of such radial pressure applying cover fabric to said bale-trunk under pressure and tension, substantially as described.

59. In a press for baling fibrous material, mechanism for supporting the forming bale-trunk, mechanism for drawing a thin, substantially continuous and uniform sheet-spiral stream of fibers from a mass of loose fibrous material and expelling the air from and pressing the resulting spiral sheet, increment by increment, spirally upon the end of the forming bale-trunk, and mechanism for simultaneously with the application of said spiral sheet to the bale-trunk applying radial pressure to the perimeter of the bale-trunk, and mechanism for simultaneously with the application of such radial pressure applying a straight sheet of cover fabric spirally to said bale-trunk under tension, substantially as described.

60. In a baling press, the combination with mechanism for supporting the forming bale and an abutment, said supporting mechanism and said abutment being relatively rotatable upon the bale axis, of a pair of opposing rollers applied to said abutment, one of said rollers extending farther than the other into the bale chamber, substantially as described.

61. In a baling press, the combination with an abutment having a working face of substantially conical form, and a feeding orifice in such abutment, of a pair of rollers for delivering a layer of material through said orifice, one of said rollers extending nearer than the other to the axis of said abutment, substantially as described.

62. In a baling press, the combination with mechanism for supporting the forming bale, of an abutment comprising a pair of rollers for delivering a layer of material through said abutment, and a feed roller for delivering material to said pair of rollers, said bale-supporting mechanism and said abutment being relatively rotatable, substantially as described.

63. In a baling press, the combination with mechanism for supporting the forming bale, of an abutment comprising a pair of rollers for delivering a layer of material through said abutment, and a feed roller provided with automatic retracting devices for engaging said material, said bale-supporting mechanism and said abutment being relatively rotatable, substantially as described.

64. In a baling press, the combination with mechanism for supporting the forming bale, a bale-forming head comprising pairs of opposing rollers and feed rollers located adjacent to the aforementioned rollers and adapted to deliver fiber thereto, movable teeth carried by said feed rollers and means for advancing and retracting said teeth, substantially as described.

65. In a baling press, the combination with mechanism for supporting the forming bale, a bale-forming head comprising pairs of opposing rollers and feed rollers located adjacent to the aforementioned rollers, bars or rods provided with teeth and hinged to said feed rollers, and means for moving said bars for extending and retracting said teeth, substantially as described.

66. In a baling press, the combination with mechanism for supporting the forming bale, a bale-forming head comprising pairs of opposing rollers and feed rollers located adjacent to the aforementioned rollers, toothed bars hinged by one end to the apex end of said feed rollers and having their opposite ends extending beyond the base ends of the feed rollers, and a cam for engaging said ends of said bars, substantially as described.

67. In a baling press, the combination with mechanism for supporting the forming bale, and an abutment for forming and applying a spiral sheet of fiber to the end of the forming bale, of a receiver inclosing the exterior of said abutment and extending above said abutment, and mechanism for moving fibrous material downward in said receiver, substantially as described.

68. In a baling press, the combination with mechanism for supporting the forming bale, and an abutment for forming and applying a spiral sheet of fiber to the end of the forming bale, and a receiver inclosing the exterior of said abutment and extending above said abutment, the portion of said receiver extending above said abutment being separated from the lower portion of said receiver by a throat or contracted portion, and mechanism located in said throat for moving fibrous material downward, substantially as described.

69. In a baling press, the combination with mechanism for supporting the forming bale, and a conical abutment for applying a spiral sheet of fibrous material to the end of the bale, of a conoidal receiver surrounding said abutment, substantially as described.

70. In a baling press, the combination with mechanism for supporting the forming bale, and a conical abutment for applying a spiral sheet of fibrous material to the end of the bale, of a conoidal receiver surrounding said abutment and extending above said abutment, substantially as described.

71. In a baling press, the combination of a conical abutment frame comprising a sector, 8, a power shaft, and suitable gearing for transmitting power from said shaft for the rotation of said abutment frame, substantially as described.

72. In a baling press, the combination of a conical abutment frame comprising a sector, 8, gear girdle, 18, on said sector, power shaft, and gear wheel mounted upon said power shaft and meshing with said gear girdle, substantially as described.

73. In a baling press, the combination of the sectors, 7 and 8, dividing pieces, 9, and positively-driven feed rollers located between said dividing pieces for delivering fibrous material into the spaces between said dividing pieces, substantially as described.

74. In a baling press, the combination of an abutment mounted for rotation and having a series of conical rollers, a gear girdle rigid and concentric with said abutment, a driving shaft, gear connection between said driving shaft and said gear girdle, a stationary gear girdle concentric with the axis of said abutment, and gearing making engagement between said stationary girdle and said conical rollers, substantially as described.

75. In a baling press, the combination of an abutment mounted for rotation and having a series of conical rollers, a gear girdle rigid upon and concentric with said abutment, a driving shaft, gear connection between said driving shaft and said gear girdle, a stationary gear girdle concentric with the axis of said abutment, gearing making engagement between said stationary girdle and said conical rollers, and a receiver into which said abutment extends, substantially as described.

76. In a baling press, a conical abutment frame comprising a sector having a central aperture, and a bale receiving chamber, said frame and said chamber being relatively rotatable, substantially as described.

77. In a baling press, the combination of the abutment frame comprising a concave sector, and conical rollers, the base shafts of the latter extending through said sector, and a bale receiving chamber, said frame and said chamber being relatively rotatable, substantially as described.

78. In a baling press, the combination of a support for the bale, and means for relatively rotating said support and said abutment frame, conical primary and secondary rollers, and a feed roller, said rollers being suitably geared for simultaneous rotation, substantially as described.

79. In a baling press, the combination with a bale receiver of an abutment frame comprising a concave sector, removable bearings located in the wall of said sector, and oblique conical rollers having their base journals resting in said bearings, said receiver and said abutment being relatively rotatable, substantially as described.

80. In a baling press, the combination of a conical abutment head, a tube extending into the base end of said abutment head, and means for relatively rotating said abutment head and said tube.

81. In a baling press, the combination of a conical abutment head, and tube extending into the base end of said abutment head, said abutment head and said tube engaging each other for rotating one upon the other, and means for relatively rotating said abutment head and said tube.

82. In a baling press, the combination of a conical abutment frame comprising a concave sector having a central opening, a tubular journal extending into said opening, an annular flange surrounding said journal at one side of said sector, a removable collar surrounding said journal at the other side of said sector, and a removable ring seated upon said sector around said central opening, substantially as described.

83. In a baling press, the combination of an abutment frame having at its apex a journal and comprising a concave sector having a central opening, and a tubular bale receiver constituting a journal extending into said opening, and means for relatively rotating said abutment and said receiver, substantially as described.

84. In a baling press, the combination of a conical abutment frame comprising a concave sector having a central opening, and a tubular journal extending into said opening and having at the outer side of said sector an annular flange and on the inner side of said sector a removable collar, substantially as described.

85. In a baling press, the combination of an abutment frame and a pair of primary and secondary rollers having relatively yielding bearings, a support for the bale, and means for relatively rotating said support and said abutment frame, substantially as described.

86. In a baling press, the combination of an abutment having a series of conical rollers, and a gear girdle concentric with the axis of said abutment, said abutment and said gear girdle being relatively rotatable, and differential gears connecting said gear girdle and said rollers, substantially as described.

87. In a baling press, the combination of an abutment having a series of conical rollers, a stationary gear girdle concentric with the axis of said abutment, and differential gearing connecting said girdle and said rollers, substantially as described.

88. In a baling press, the combination of an abutment having a series of conical rollers, a gear girdle rigid upon and concentric with said abutment, a driving shaft, gear connection between said driving shaft and said gear girdle, a stationary gear girdle concentric with the axis of said abutment, and differential gearing making engagement between said stationary girdle and said conical rollers, substantially as described.

89. In a press for baling fibrous material, the combination with an abutment for forming the material into a thin spiral sheet and applying said sheet under pressure to the end of the forming bale, of a tubular passage for the forming bale, the interior of said passage having devices for engaging the perimeter of the bale, substantially as described.

90. In a press for baling fibrous material, the combination with an abutment for forming the material into a thin spiral sheet and applying said sheet under pressure to the end of the forming bale, of a tubular passage for the bale, said passage comprising obliquely-yielding devices for resisting the advance of the bale, substantially as described.

91. In a press for baling fibrous material, the combination with a rotary abutment for forming the material into a thin spiral sheet and applying said sheet under pressure to the end of the forming bale, of a tubular passage for the bale, said passage being provided with means for rotating the bale while it is being pressed forward by said bale-forming head, the rotation of the bale being at a velocity different from the velocity of said head, substantially as described.

92. In a baling press, the combination with mechanism for forming and applying a spiral sheet of fibrous material to the end of the forming bale, of oblique hyperboloid rolls surrounding and engaging the perimeter of the bale, substantially as described.

93. In a baling press, the combination with mechanism for forming and applying a spiral sheet of fibrous material to the end of the forming bale, of oblique hyperboloid rolls surrounding and engaging the perimeter of the bale, and mechanism for delivering a strip of bale cloth to the perimeter of the bale, substantially as described.

94. In a baling press, the combination with mechanism for forming and applying a spiral sheet of fibrous material to the end of the forming bale, of oblique hyperboloid rolls surrounding and engaging the perimeter of the bale, and mechanism for delivering a strip of bale cloth to the perimeter of the bale between one of said hyperboloid rolls and the bale, substantially as described.

95. In a baling press, the combination with an abutment for forming a spiral sheet of fibrous material and applying the same to the end of the forming bale, and a bale tube concentric with the axial line of said abutment, of oblique hyperboloid rolls surrounding and engaging the perimeter of the forming bale, substantially as described.

96. In a baling press, the combination with mechanism for supporting the forming bale, of a bale-forming head comprising primary rollers and secondary rollers, the latter being yielding with reference to the former, means for relatively rotating said head and said supporting mechanism, substantially as described.

97. In a baling apparatus, means for forming a rotating and endwise moving bale column, and means for automatically severing a section of the column during the movement of the latter.

98. In a baling apparatus, the combination with means for forming a rotating and endwise moving bale column, of a cutter movable with the column as the latter advances endwise and also movable during the advance of the column to sever the same, and means operating automatically to bring the cutter into action intermittently to sever bale lengths from the column.

99. In a baling apparatus, the combination with means for forming a rotating and endwise movable bale column, of a cutter movable endwise of the column and also transversely thereof to sever said column during its endwise advance, and mechanism operating automatically to bring the cutter into action after predetermined endwise movement of the column and to effect the retraction of the cutter to its normal position.

100. In a baling apparatus, means for forming and advancing the bale, a support, a cutter arranged to swing from said support and to slide thereon whereby said cutter is enabled to advance with a bale during the cutting operation, a spring resisting the sliding movement of the cutter on the support and arranged to return the latter longitudinally of the bale to its initial position, and means for automatically bringing the cutter into action to sever a portion of the column when the column has reached a predetermined length.

101. In a machine for baling fibrous material, mechanism for forming and rotating a bale-trunk and severing mechanism operating transversely across the bale-trunk, said mechanisms being so timed as that the severing mechanism will slowly approach the axis of the rotating bale-trunk, whereby a gradually deepening kerf is formed around said trunk.

102. In a baling press, the combination with mechanism for supporting the forming bale-trunk in the horizontal position, mechanism for forming a thin, substantially continuous and uniform spiral sheet from a mass of loose fibrous material and forming said sheet into a bale-trunk, and mechanism for severing a portion from said trunk, of mechanism for moving said severed portion endwise, substantially as described.

103. In a baling press, the combination with mechanism for supporting the forming bale-trunk in the horizontal position, mechanism for forming a thin, substantially continuous and uniform spiral sheet from a mass of loose fibrous material and forming said sheet into a bale-trunk, and mechanism for severing a portion from said trunk, of mechanism for moving said severed portion endwise and sidewise, substantially as described.

104. In a baling press, the combination with a bale-trunk support and mechanism for forming a bale-trunk of a spiral sheet of fibrous material, of bale-trunk severing mechanism mounted for moving away from the bale-trunk by gravity, and mechanism for moving said severing mechanism toward the bale-trunk, substantially as described.

105. In a press for compressing cotton and other fibrous materials, the combination with a head provided with openings through which the material is fed, a holder in which the bale is formed and means for relatively rotating such head and holder wherein the material is compressed, of severing mechanism for separating a bale from such compressed material, and mechanism for setting said severing mechanism into action by the longitudinal movement of said compressed material, substantially as and for the purpose set forth.

106. In a baling press, the combination of mechanism for supporting a bale-trunk and mechanism for applying a layer of fibrous material spirally and obliquely and under suitable tension around the end of said bale-trunk, and automatic mechanism for applying bale cloth around said trunk, and automatic mechanism for severing said bale-trunk transversely, substantially as described.

107. In a baling press, the combination with a support for the forming bale and means for delivering a strip of bale cloth to said bale, of automatic mechanism for continuously applying a layer of fibrous material to the end of the bale and propelling said bale with a spiral movement along said support, whereby said bale cloth is wound spirally around said bale, substantially as described.

108. In a bale press, the combination with means for forming a cylindrical column of compressed material by endwise pressure, of mechanism for severing a completed bale from the column of compressed material, a support for said severing mechanism, said support being shiftable parallel to the axis of the machine, and mechanism upon said support adapted to engage said column, whereby the end of said column may bear against said mechanism and move said support and said severing mechanism synchronously with the movement of said column, substantially as described.

109. In a bale press, the combination with means for forming a cylindrical column of compressed material by endwise pressure, of mechanism for severing a completed bale from the column of compressed material, a support for said severing mechanism, said support being shiftable parallel to the axis of the machine, and mechanism upon said support extending into the path of said column, whereby the end of said column may bear against said mechanism and move said support and said severing mechanism synchronously with the movement of said column, substantially as described.

110. In a baling press, the combination with mechanism for applying a continuous layer of fiber spirally to the end of a bale-trunk and advancing said trunk, of severing mechanism, and means for advancing said severing mechanism transversely and longitudinally to the axis of the bale-trunk, substantially as described.

111. In a baling press, the combination with mechanism for forming a bale-trunk and advancing said trunk by the application of a spiral layer of fibrous material, of severing mechanism, means for advancing the severing mechanism transversely and longitudinally to the axis of the bale-trunk, and means for returning the severing mechanism after the bale has been severed, substantially as described.

112. In a baling press, the combination with mechanism for applying a layer of fibrous material spirally to the end of a bale-trunk and advancing said trunk, of a severing saw, and means for advancing said saw longitudinally and transversely to the axis of the bale-trunk, substantially as described.

113. In a baling press, the combination with mechanism for applying a layer of fibrous material spirally to the end of a bale-trunk and advancing said trunk, of a saw arm, a band saw carried thereby, and means for advancing the saw arm longitudinally and transversely to the axis of the bale-trunk, substantially as described.

114. In a baling press, the combination with mechanism for applying a layer of fibrous material spirally to the end of a bale-trunk and advancing said trunk, of a rotatable and longitudinally movable shaft, a saw arm carried thereby, a severing saw carried by said saw arm, and means for imparting a simultaneous rotation and longitudinal movement to the saw shaft, whereby the saw is moved longitudinally and transversely to the axis of the bale-trunk, substantially as described.

115. In a baling press, the combination with mechanism for applying a layer of fibrous material spirally to the end of a bale-trunk and advancing said trunk, of a rotatable and longitudinally movable shaft, a saw arm carried thereby, a band saw carried by said saw arm, and means for imparting to the shaft simultaneous rotation and longitudinal movement, substantially as described.

116. In a baling press, the combination with bale-forming mechanism, of a saw arm adapted for rotary and longitudinal movement in relation to the bale-trunk, a severing saw carried by said arm, a plate provided with a spiral cam groove, and a cam arm connected with the saw arm and working in the groove for rotating said shaft and moving said saw arm in a plane to which the bale-trunk axis is perpendicular, substantially as described.

117. In a baling press, the combination with a delivery rack for delivering the bale, of severing mechanism adapted to cut off the bale after reception of the bale-trunk on the rack, and mechanism for operating the rack after severance of the bale, substantially as described.

118. In a baling press, the combination with a movable delivery rack, of severing mechanism adapted to transversely sever the bale-trunk, and means, operated by the severing mechanism, for releasing the rack for delivering the bale after the bale has been received thereon, substantially as described.

119. In a baling press, the combination with a movable delivery rack and locking mechanism therefor, of severing mechanism adapted to transversely sever the bale-trunk after reception on the rack, mechanism adapted to unlock or release the rack, and lifting mechanism for returning the rack to the locked position after the bale has been delivered, substantally as described.

120. In a baling press, the combination with mechanism for forming a continuous bale-trunk, of a movable delivery rack and severing mechanism adapted for movement longitudinally and transversely of the bale-trunk, means actuated by the movement of the rack to move the severing mechanism a short distance toward the rear of the machine after the bale has been severed, and means for drawing the severing mechanism in reverse direction and swinging it across the path in front of the stub after the bale has been delivered by the rack, substantially as described.

121. In a baling press, the combination with severing mechanism adapted for longitudinal movement in relation to the bale-trunk being formed, and a cam arm carried by said severing mechanism, of a delivery rack having a cam adapted to bear on the cam arm and also capable of longitudinal movement, substantially as described.

122. In a baling press, the combination with severing mechanism adapted for movement longitudinally of the bale, of a cam arm carried by said severing mechanism and a delivery rack also adapted for longitudinal movement, and a cam carried by said rack and having oblique faces adapted to engage with the cam arm, whereby the rack is moved longitudinally, substantially as described.

123. In a baling press, the combination with movable severing mechanism, of a cam arm carried thereby, a cam plate with which the cam arm engages, a delivery rack and rack locking mechanism in operative relation with the severing mechanism, substantially as described.

124. In a baling press, the combination with severing mechanism adapted for longitudinal movement in relation to the bale-trunk, of a cam plate having a spiral groove, a cam arm carried by said severing mechanism which plays in the groove of said cam plate, a delivery rack adapted for longitudinal movement in relation to the bale and which is provided with a cam adapted to bear against the cam arm whereby the rack is shifted longitudinally, and rack locking mechanism in operative relation with the severing mechanism, substantially as described.

125. In a baling press, the combination with severing mechanism adapted for longitudinal movement in relation to the bale-trunk, of a hinged standard connected to said severing mechanism, a movable delivery rack adapted to receive the bale-trunk, locking mechanism for the hinged standard, and mechanism actuated by the movement of the rack adapted to unlock the hinged portion of the standard, substantially as described.

126. In a baling press, the combination with a longitudinally movable shaft, of a sectional end standard carried thereby, a guide for the base portion thereof, a hinged portion connected to the aforesaid base portion, a standard locking member provided with a lever, and a delivery rack adapted to engage with said lever and unlock the hinged portion of the end standard, substantially as described.

127. In a baling press, the combination with a saw carriage, and an end standard supported by said saw carriage, of a rotatable abutment supported by said standard in line with the axis of the machine, substantially as described.

128. In a baling press, the combination with mechanism for forming a bale-trunk and mechanism for severing said trunk, of a bale-delivering rack arranged to move longitudinally away from said bale-trunk after the bale has been severed, and discharge said bale laterally, substantially as described.

In testimony whereof, I have signed this specification in the presence of two subscribing witnesses.

WILLIAM L. SPOON.

Witnesses:
Geo. R. Hamlin,
Wm. L. Ford.